United States Patent
Fradet

(10) Patent No.: US 8,434,722 B2
(45) Date of Patent: May 7, 2013

(54) SKYDIVING EQUIPMENT TO DISTRIBUTE THE TENSION FORCES OF A DROGUE PARACHUTE

(76) Inventor: Eric Fradet, Le Tignet (FR)

(*) Notice: Subject to any disclaimer, the term of this patent is extended or adjusted under 35 U.S.C. 154(b) by 77 days.

(21) Appl. No.: 13/043,652

(22) Filed: Mar. 9, 2011

(65) Prior Publication Data

US 2011/0220765 A1  Sep. 15, 2011

(30) Foreign Application Priority Data

Mar. 9, 2010  (FR) ...................................... 10 51677

(51) Int. Cl.
- *B64D 17/00* (2006.01)
- *B64D 17/30* (2006.01)
- *B64D 17/46* (2006.01)
- *B64D 17/62* (2006.01)

(52) U.S. Cl.
USPC ........ 244/148; 244/147; 244/149; 244/151 R; 244/151 A; 224/158

(58) Field of Classification Search .................. 244/147, 244/148, 149, 149 R, 151 A, 151 B, 151 R; 224/158, 163, 580

See application file for complete search history.

(56) References Cited

U.S. PATENT DOCUMENTS

| | | | | |
|---|---|---|---|---|
| 2,316,896 | A * | 4/1943 | Smith | 244/148 |
| 2,845,241 | A * | 7/1958 | Samms | 244/148 |
| 3,437,295 | A * | 4/1969 | Istel et al. | 244/148 |
| 4,337,913 | A * | 7/1982 | Booth | 244/151 B |
| 4,746,084 | A * | 5/1988 | Strong | 244/151 R |
| 4,923,150 | A * | 5/1990 | Calkins et al. | 244/151 B |
| 6,626,400 | B1 * | 9/2003 | Booth | 244/149 |
| 6,869,047 | B2 * | 3/2005 | Pouchkarev | 244/155 A |
| 6,983,913 | B2 * | 1/2006 | Auvray | 244/151 A |

FOREIGN PATENT DOCUMENTS

| | | |
|---|---|---|
| EP | 1222119 B1 | 7/2002 |
| FR | 2915735 A1 | 11/2008 |
| WO | 01/28876 A1 | 4/2001 |

OTHER PUBLICATIONS

Definition of "Concentric", Merriam-Webster Dictionary, www.merriam-webster.com/dictionary/concentric, accessed Nov. 7, 2012.*
French Search Report, dated Nov. 5, 2010, from corresponding French application.

* cited by examiner

*Primary Examiner* — Vivek D. Koppikar
*Assistant Examiner* — Michael Wang
(74) *Attorney, Agent, or Firm* — Young & Thompson

(57) ABSTRACT

A skydiving equipment with a drogue parachute to capture the deployment bag until the opening, and to suspend the parachutist(s) in a horizontal position during the free fall, while distributing the tension forces of the drogue parachute such that the ripcord operation is effortless, includes a first fastening strap bearing a lower tab and a second fastening strap bearing an upper tab to fasten the drogue parachute drogue bridle to the parachute pack at the desired level of the main container. A three-ring system connects the upper tab and the lower tab to the drogue parachute drogue bridle and is operational to effortlessly cause the release of the upper tab and the lower tab out of the drogue bridle simultaneously or successively, while the main container opens at a different time.

12 Claims, 20 Drawing Sheets

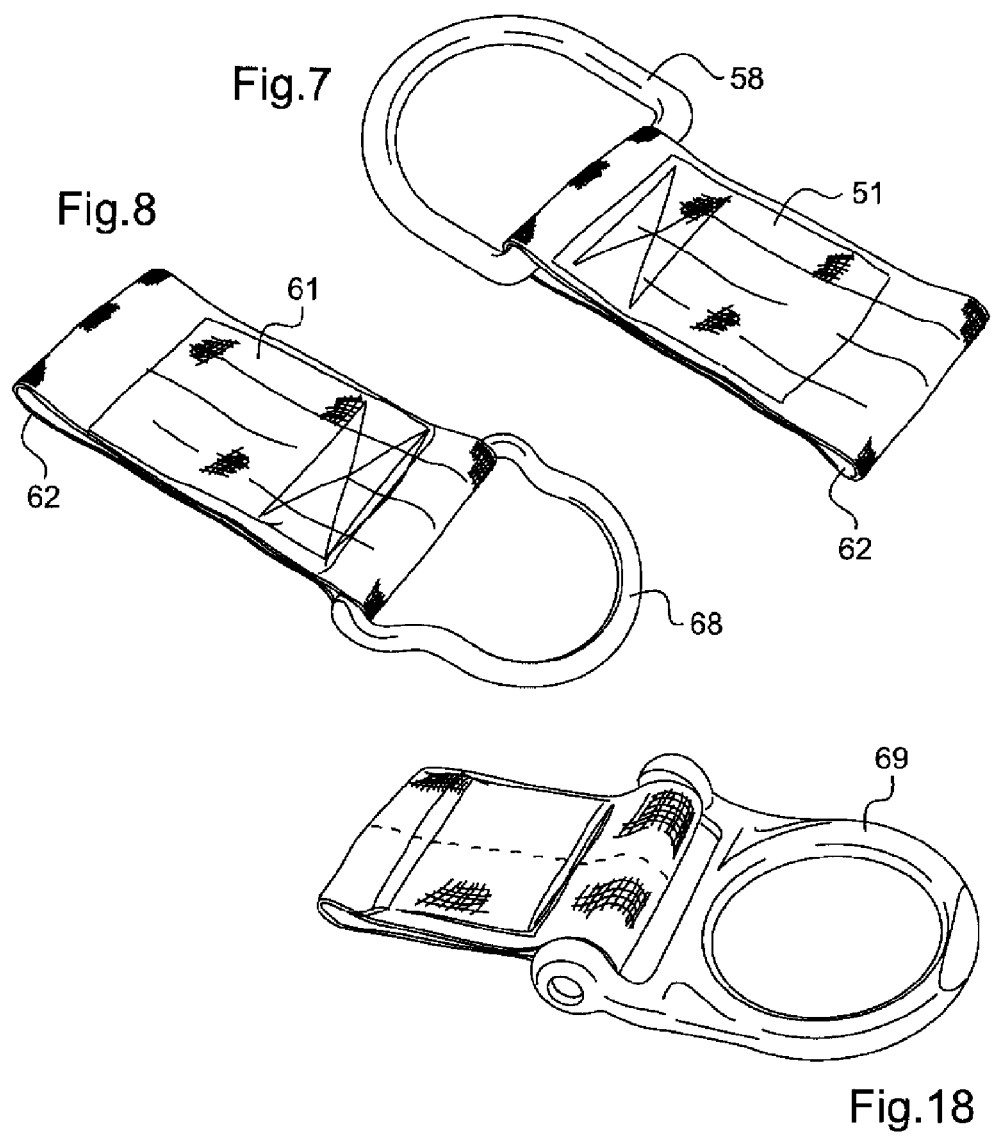

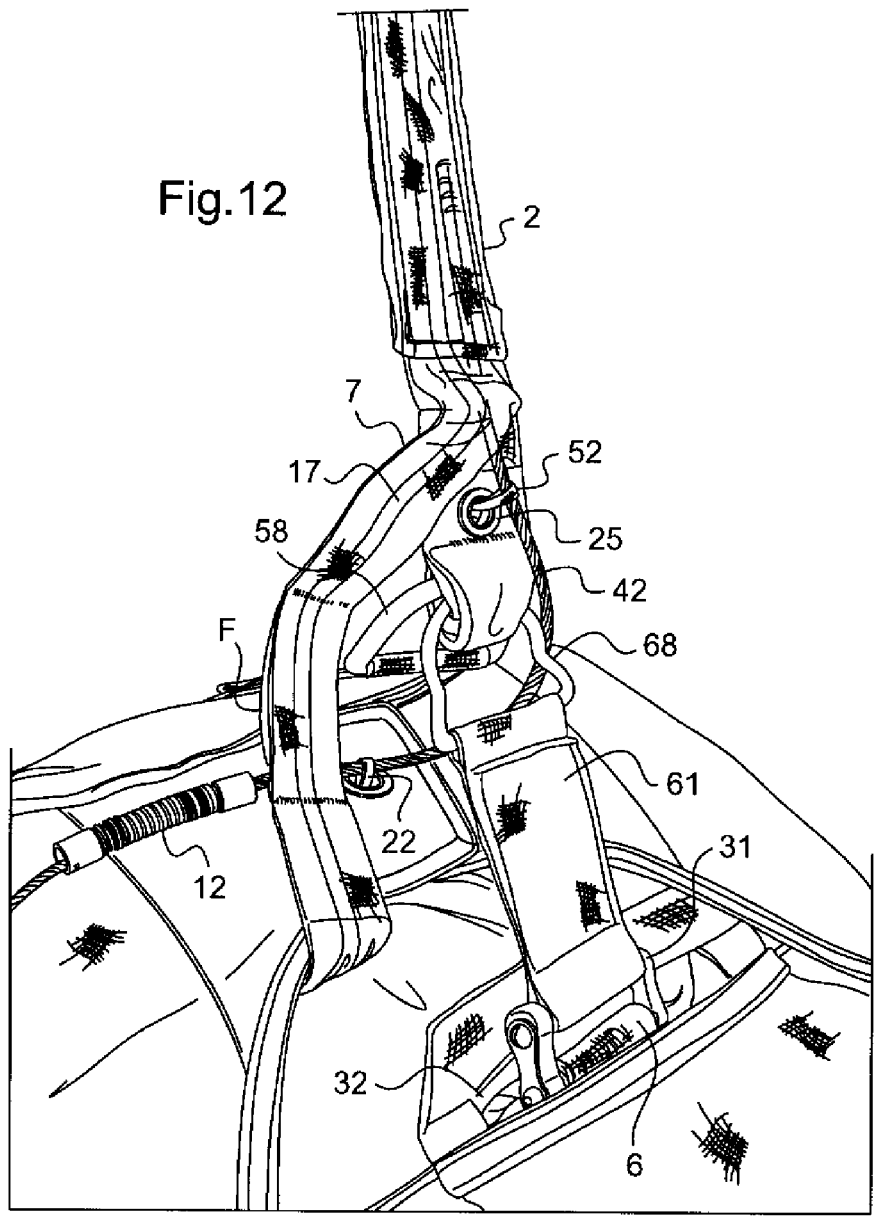

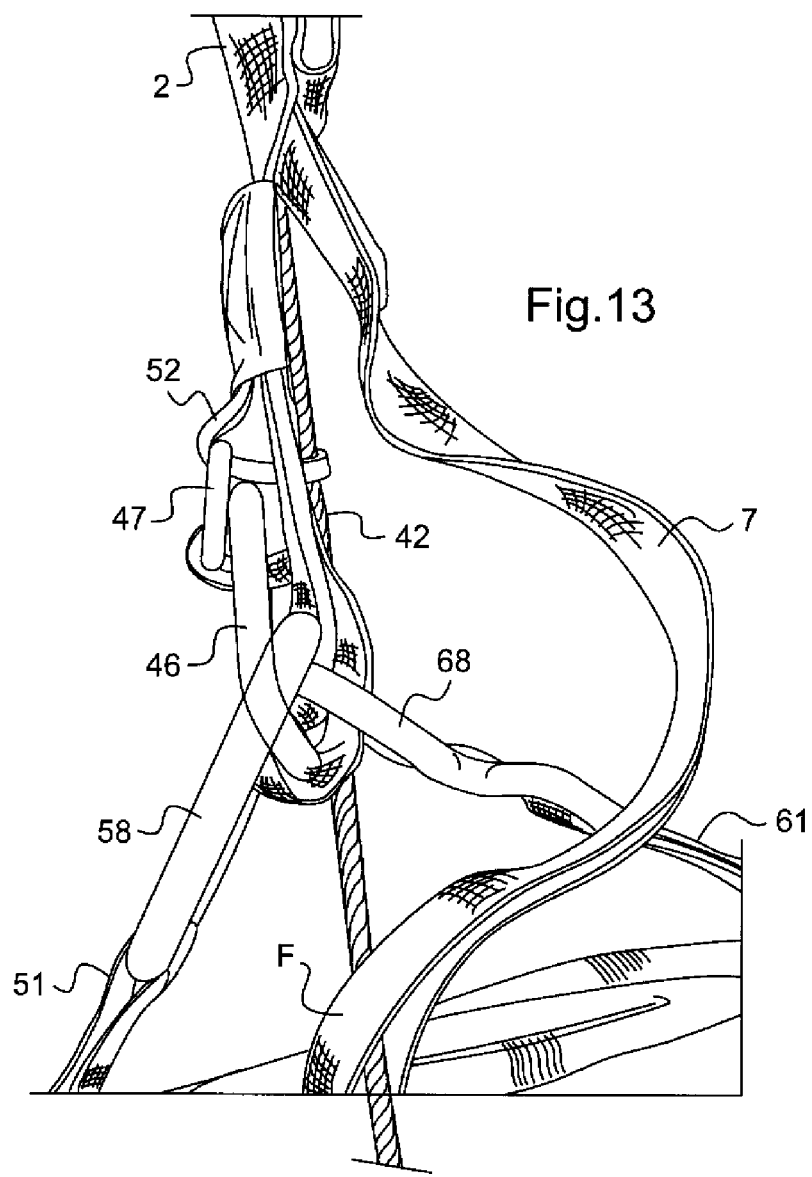

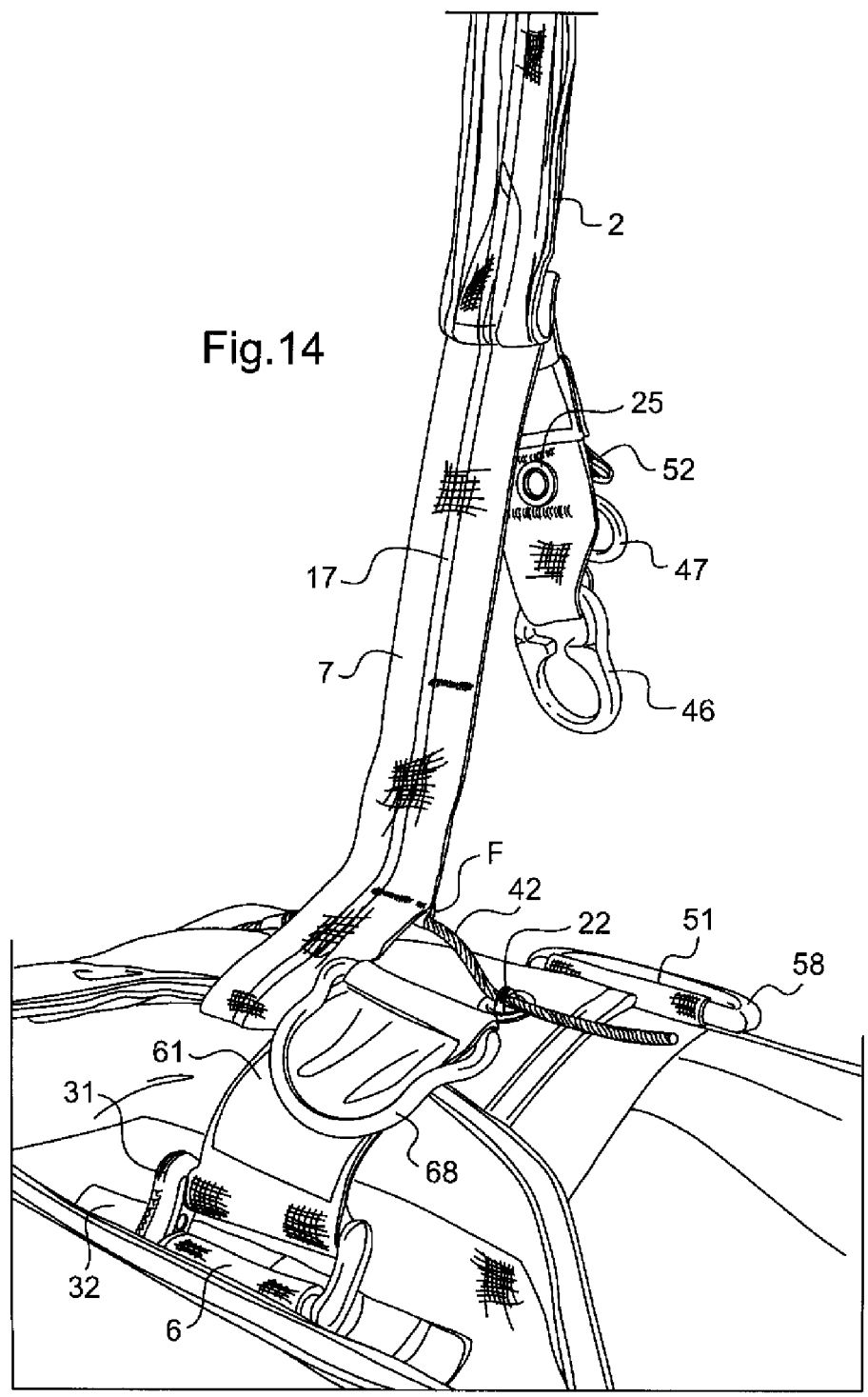

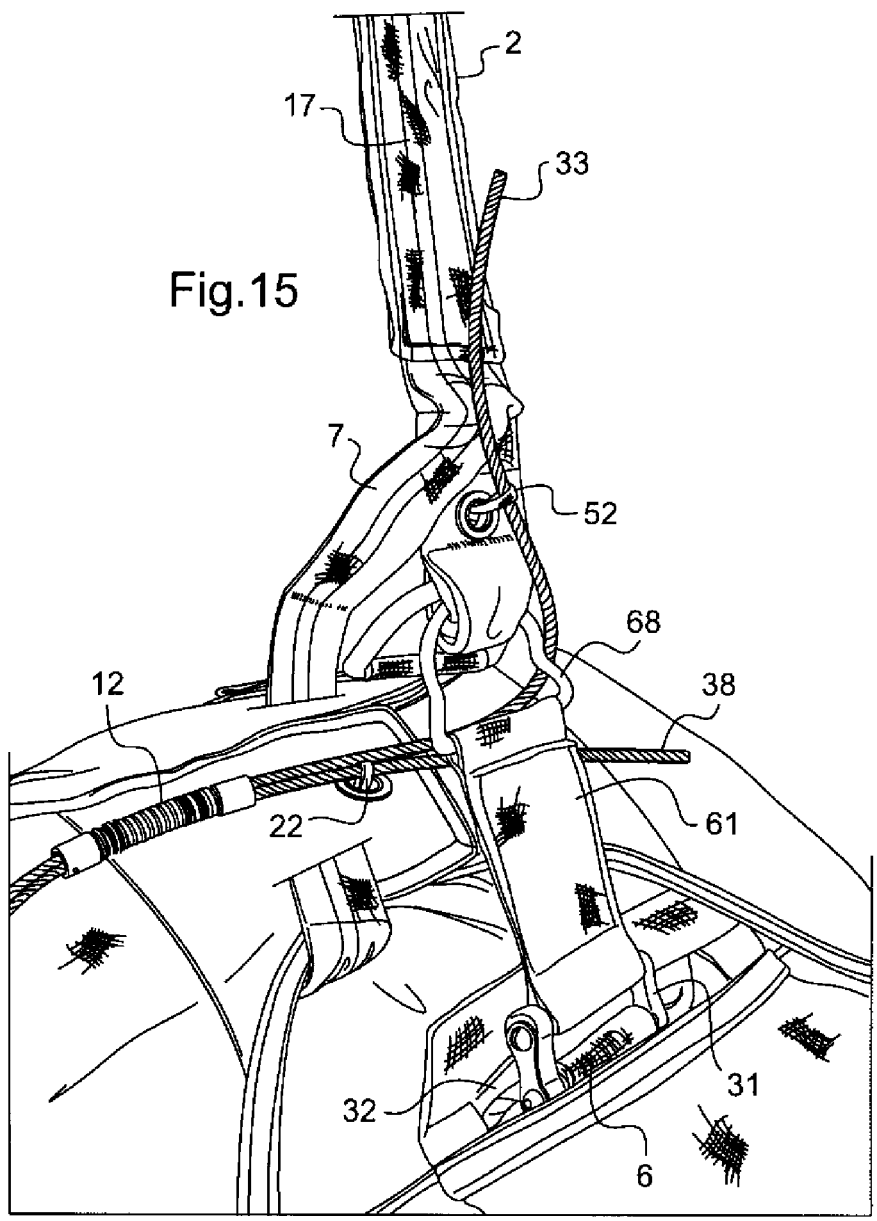

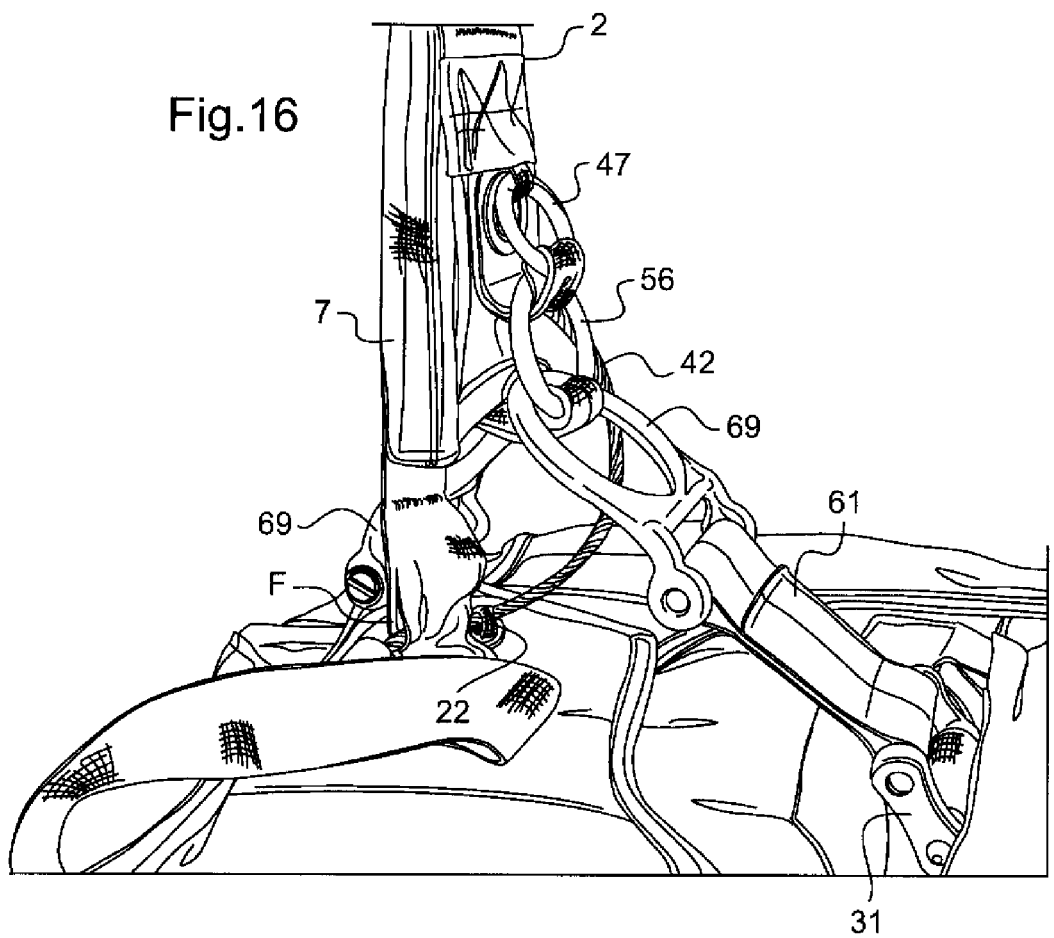

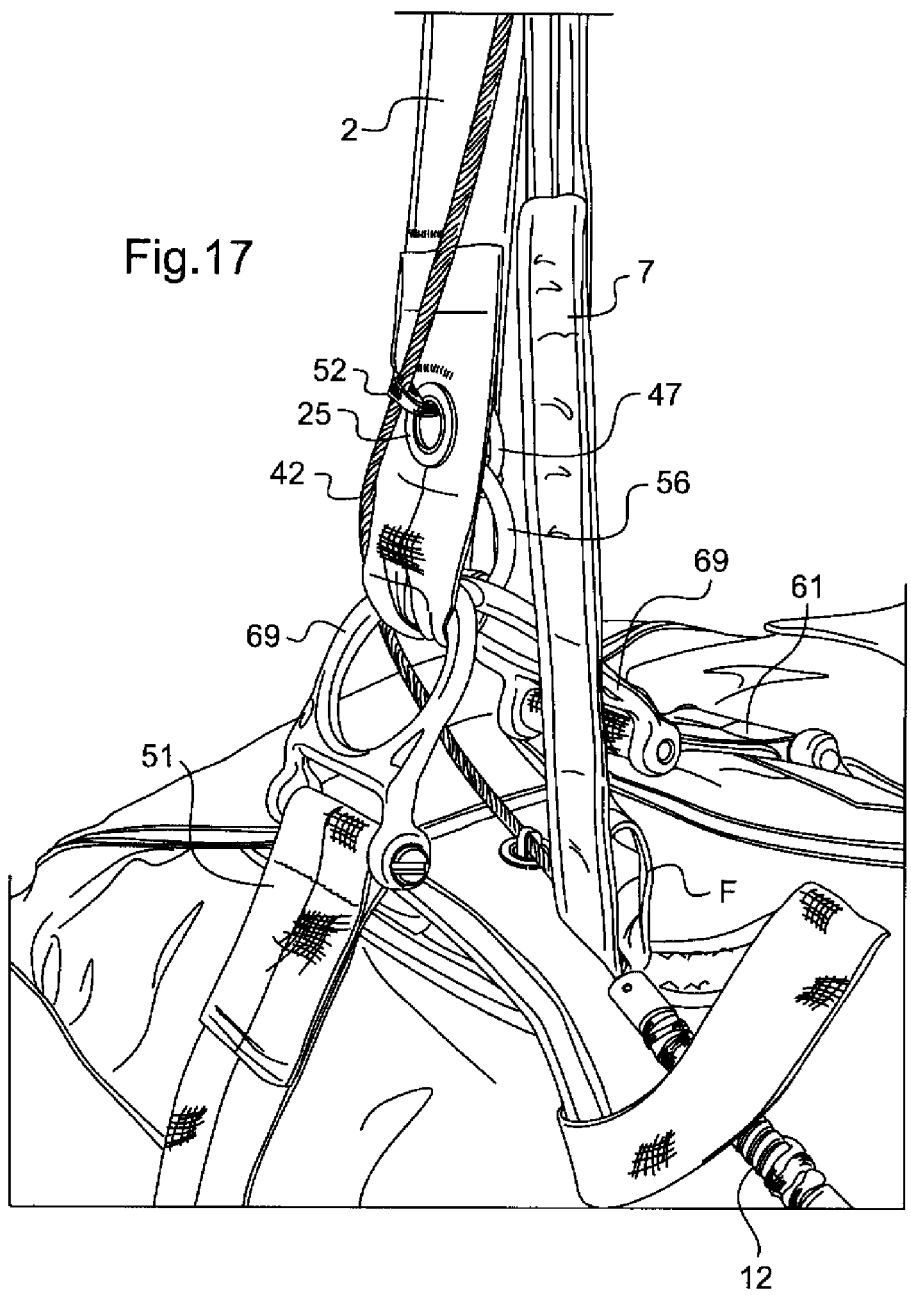

SKYDIVING EQUIPMENT TO DISTRIBUTE THE TENSION FORCES OF A DROGUE PARACHUTE

CROSS REFERENCE TO RELATED APPLICATIONS

Applicant claims priority under 35 U.S.C. 119 of French patent application No. 1051677 filed on Sep. 3, 2010.

BACKGROUND OF THE INVENTION

The present invention relates to a skydiving equipment with a centralized fastener, to distribute the tension forces of a drogue parachute on the parachute pack while being able, in particular, to suspend its user(s) in a horizontal position during the free fall, and ensuring the holding of the deployment bag until the desired opening.

It is known that the parachute pack consists of the equipment where the canopies are packed; it includes a pack which comprises the reserve or upper container and the main or lower container, and primary and secondary straps, which constitute the harness strap device in order to tie-down the reserve and main containers.

During tandem skydiving with a passenger or a load, a first small parachute is released before the opening of the main parachute.

This first parachute is smaller than the main parachute, it is not packed in the main container and it is opened prior to the opening of the main parachute.

This first parachute is called the drogue parachute and in the end enables the extraction of the main parachute when a desired altitude is reached.

Further in the description, "drogue bridle" will designate the strap which connects the drogue parachute to the deployment bag. It will be considered that the drogue bridle is located between the fastening means to the parachute pack and the drogue parachute.

The European patent EP-A-1 222 119 and the French patent FR 2915735 in the name of the applicant, disclose some devices for which the central fastening of the drogue bridle to a parachute pack main container is achieved thanks to a stop which is captured by the closure of the main container flaps.

These two devices are intended to enable the positioning of the tandem couple in free fall in a horizontal position with a closure of the main container which is associated to the locking of the drogue bridle.

However, in the current central fastener devices, when the load is very heavy, it is noticed that the traction of the drogue bridle, whether it is single or with multiple fastening tabs, sometimes exerts a considerable tension on the stop and the closing loop, this tension being transmitted to the ripcord cable which holds the flaps in a closed state, such that the central fastener devices require more effort than the prior art devices to manually extract the ripcord because the latter have a 3-ring-system type force-reduction unit which is located between the drogue bridle and the parachute pack, which provides a mechanical advantage enabling the release of the drogue parachute and the opening of the main container with minimum effort.

One of the consequences which is inherent to this drawback of the prior art devices is that it causes incidents such as "hard to pull the main handle". Another drawback of the current central fastener devices is the complication that the closure of the flaps can generate, such a complication being caused by the presence of the stop which prevents the closing flaps from superimposing and can induce errors in the routing of the closing loop at the time of the packing sequence.

BRIEF SUMMARY OF THE INVENTION

The present invention aims at overcoming all or a part of the drawbacks of the prior art devices, and discloses a device with which the anchoring effort is not transferred to the main container closing flaps, while ensuring a horizontal positioning during the free fall and guaranteeing the holding of the deployment bag in the main container as long as the drogue bridle is not released.

The present invention relates to a skydiving equipment enabling a horizontal position for the tandem couple (pilot+passenger or load) during the fall, provided with a drogue bridle fastening system which is arranged above and substantially in alignment with the main container center, such that it is represented under the name of "centralized fastener", and consists in connecting the parts which are to be able to be released, by a 3-ring-system type device, such that the traction of the tensioned drogue bridle distributes its effort on one or more secondary fastening straps which are directly or indirectly connected to the harness strap device so that it does not transfer any tension on the main container closing flaps, nor on the opening means thereof, and ensures the holding of the deployment bag in the main container in the case where the latter opens by accident.

This invention includes, excluding this main arrangement, some other arrangements which are to be used preferably at the same time and which will detailed more explicitly hereinafter, particularly a second arrangement which associates together the closure of the main container and the locking of the drogue bridle fastening device to the parachute pack, by a unique ripcord.

Thus, the opening of the main container is achieved, according to the embodiments, either in two separate steps, following a manual action unlocking only the drogue bridle out of the big rings and the outgoing drogue bridle which operates the main container opening means, in particular, by the fastening of an aperture on the strap release, or in two steps which follow one another instantaneously.

In the embodiment of the invention which links the opening of the main container to the outgoing drogue bridle, the aperture is passed through by the cable between the end of the ripcord protector housing and the main container closing point.

The different exemplary embodiments which are provided herein are intended to make the reader understand that in the preferred embodiment, there is only one ripcord cable to successively operate the release of the drogue bridle and the opening of the main container; it is therefore necessary to provide for the arrangement of the ripcord cable within the aperture which is located on the strap release.

And a third arrangement consists in operating the main handle by means of a connecting cord which is connected thereto, at a location enabling to remotely operate on its withdrawal.

For that purpose, the present invention discloses a skydiving equipment including a parachute pack which is provided, as usually known, with a pack which is divided into a upper compartment known as "reserve container", comprising a reserve parachute which is folded in a reserve deployment bag and a lower compartment known as "main container", comprising a main parachute which is folded in a main deployment bag which is provided in the main container enclosure.

The reserve container and the main container each consist of a group of flaps which are to be brought together and have at least one closing point for that purpose.

The main arrangement consists in that the drogue bridle connects to the parachute pack at a centralized fastening point which joins at least two fastening straps which are directly or indirectly fastened to the harness strap device and come from opposite directions.

The main handle operates a releasing mechanism of the drogue bridle and the opening of the main container.

The release mechanism of the drogue bridle is remote from the closing system of the main parachute container.

According to the invention, the parachute pack is provided with at least two hooking points which consist of rings which are located at the fastening means end, these hooking points being released from the drogue bridle simultaneously or successively relative to each other.

The free end of the fastening straps is called fastening tab, these fastening tabs can be releasable from the fastening straps. Adjustment means are also provided for, allowing the adjustment of the fastening tabs length such that the hooking means can be joined towards the bottom center or the top center of the main container in order to move the axis of the location of the drogue bridle based on the positioning of the load.

The fastening means surround the main container separately from the closing flaps or are connected in part to the flaps and join each other above the main container. Thus, after the extraction of the drogue parachute out of its pocket, the drogue bridle holds and, provisionally during the time of the free fall, pulls these fastening means which are temporarily brought together for the free fall stage, by a releasable fastening device which maintains them assembled, connected together to the drogue bridle during the period prior to the opening of the main container and which will occur at the desired altitude.

These fastening straps can also form only one strap which is directly or indirectly integral with the harness strap device, or two separated straps.

This original arrangement is advantageous insofar as it distributes the traction forces which are generated by the drogue parachute on several points of the parachute pack and not only on the sole closing flaps of the main container or on only one hooking point which is located at the top or at the bottom of the parachute pack, as it exists in the prior art devices.

This arrangement enables the drogue bridle to simultaneously exert a traction effort in a distributed and an uniform manner around the main container, advantageously at equidistance from the main container center, when the center of gravity of the pilot and his/her passenger (or his/her load) is located in the axis of suspension of the drogue parachute.

As a result, the equipment according to the invention favours, thanks to its centralized fastener, a horizontal attitude for the couple during free fall, while distributing the traction efforts of the drogue parachute on the whole of the parachute pack, such that the main container ripcord is operated effortlessly.

According to a particular and preferred embodiment, the hooking means of the drogue bridle to the fastening tabs consist of metal rings which are secured to small fabrics webbings located at the drogue bridle end which is opposite to the drogue parachute fastening area, these means associating in a complementary way with a metal ring which is fastened to each fastening tab end.

Once connected together, the fastening tabs have an inverse-"V"-shaped arrangement with both tips of the letter "V" being turned towards the harness strap device, each of the fastening tabs visible ends being the extension of the fastening straps which are fastened directly or indirectly to the harness strap device, which is located in the backpad of the parachute pack.

Both fastening straps can be partially fastened to the main container fabrics and, in an alternate embodiment of the device according to the invention, the fastening tabs can be removable from the fastening straps thanks to a quick release fastener which links up the fastening tab and the fastening strap, in order to modify the tandem parachute pack so as to design it for solo skydives, without using the drogue parachute, as part of multi-mission jumps which are performed for example by military parachutists.

The invention can also provide simple means to allow, by a simple adjustment operation, the adjustment of the parachute pack to a centering operation of the drogue bridle, which should be disposed at the bottom center or at the top center of the main container in order to balance the pilot in a horizontal position based on the positioning of his/her load.

The main container closing flaps have a proportioned size to cover the fastening tabs length in order to avoid an interference risk during the opening of the main parachute.

The closure of the main container is not altered in any way and the locking of the fastening device requires, in accordance with the invention, to connect both fastening tabs to the drogue bridle such that the fastening point can bring them together either in the middle of the main container or at the bottom center or the top center of the main container.

The interest of the device according to the invention can be easily understood. Thanks to the holding of the drogue bridle to the parachute pack by at least two distinct fastening points which surround the main container, the device of the invention ensures the horizontal position of the tandem couple, or of the pilot in any position of the load, during the free fall stage and in the event of an untimely opening of the main container following, for example, any break of the closing loop, and guarantees the holding of the main deployment bag, as long as the drogue parachute is not released. The main deployment bag thereby remains captured by being surrounded in the main container thanks to the fastening points which are connected to each other.

Consequently, this device prevents any entanglement risk between the drogue bridle and the main parachute, such a situation being well known for the prior art devices, while enabling an opening of the main container effortlessly.

The main container opening control is preferably executed by means of a single control ripcord cable releasing the drogue bridle and opening the main container, or by means of two distinct and paired cables, providing the same function.

Thus, after a free fall period during which the pilot extracts the drogue parachute from its pocket, as known in the prior art, the pilot controls the disconnection between the fastening tabs and the drogue bridle at the desired altitude by a manual action on the ripcord, which unlocks the releasing system of the drogue bridle and the main container closing loop.

The upper and lower fastening tabs separate from each other and loosen naturally, following the suppression of the tension of the drogue bridle.

This arrangement makes said fastening straps, each coming from two distinct areas of the parachute pack and being located directly on or around the main container, instantaneously and mutually or successively releasable by only one handle.

Advantageously, the fastening device, which is releasable from the hooking points to the drogue bridle, consists of the multi-concentric-ring releasing system which is described in U.S. Pat. No. 4,337,913 in the name of Booth, and widely used in skydiving, or of any other releasing system.

In the preferred embodiment of the invention, each of the upper and lower fastening tabs is connected to a big ring, one of the big rings is called "upper big ring" because it is secured to a fastening tab which protrudes from the top of the main container, whereas the other big ring is called "lower big ring" because it is secured to a fastening tab which is located at the bottom of the main container.

The drogue bridle brings both big rings together at a unique point. Both big rings have a shape and a size which enable them to fit, at least partly, into each other during the assembly.

This arrangement consists preferably in using big rings having semi-circular-shaped ring elements having different diameters for both big rings, the outer diameter of the upper big ring semi-circle shape, which is designed to fit into the lower big ring, being inferior to the inner diameter of the lower big ring semi-circle shape.

This same arrangement also consists preferably in using big rings with different torus thicknesses.

The lower big ring has a torus diameter which is superior to the one of the upper big ring, such that when it is strained by the traction of the drogue parachute, it tends to drive downwards the upper big ring which has the inferior torus diameter.

This arrangement of the preferred embodiment has been selected so as to ensure the conservation of the aligned disposition of the end of the upper big ring under the end of the lower big ring during the traction which will be performed by the drogue bridle during its tensioning.

The upper big ring has a shoulder at its base in order to enable its semi-circle to fit into the semi-circle of the lower big ring during storage, the width base of the upper big ring being smaller than that of the lower big ring, such that it acts as a stop at storage, and ensures, at the moment of tensioning the drogue bridle, that the upper big ring does not pass through the lower big ring.

The holding together of both upper ends of the big rings during the tensioning of the drogue bridle is ensured by using a two-plane oblong ring as an intermediate ring which is connected to the end of the drogue bridle, and a small ring with a circular shape and a concentric diameter with respect to other rings, such that it can be inserted into the intermediate ring.

When the drogue parachute is extracted and the drogue bridle is tensioned, the traction of the drogue parachute exerts on both big rings and maintains the upper ends of the big rings in close contact one into and below the other, while the fastening tabs coming from two opposite directions naturally separate the diameter base of the semi-circular shapes of the two big rings.

The setting up of the drogue bridle fastening device is carried out after closure of the main container; the upper big ring semi-circle is inserted into the lower big ring semi-circle, then the intermediate ring, which is fastened to the drogue bridle end, catches both big rings at the same time, before receiving the small ring which is also fastened on the drogue bridle.

The ring holding device is ensured thanks to a locking loop which is secured to the drogue bridle, said loop being locked through a cable which is connected to the main handle, after passing of said loop into a grommet which is fastened directly on the drogue bridle.

The set which is formed by the small ring and the intermediate ring is held in a position pressed against the drogue bridle with the small ring and the intermediate ring being aligned together, above the contact zone of the two contacted big rings.

One alternate preferred embodiment which does not change the invention characteristics in any way, consists in changing the mounting order of the upper big ring and lower ring on the fastening tabs.

A second feature of the preferred embodiment of the device according to the invention is that the closure of the main container and that of the drogue bridle fastening device is carried out by the continuity of a single ripcord cable which is connected to the main handle, so that the withdrawal of the ripcord cable out of the main container closing loop first causes the unlocking of the drogue bridle fastening device.

The release of the drogue bridle is controlled by the main handle which is separated and arranged separately from the main container closing system in a way which is known in itself.

The first step in the closing sequence of such a preferred device consists in providing the main deployment bag inside the main container so as to enclose it with all the closing flaps, by causing the closing loop to pass through each flap, after superimposing each grommet provided on each of the main container closing flaps, in a way which is known in itself.

Then, it is suitable to arrange the ripcord cable between the output of the ripcord protector housing and the main container closing loop, such that it passes through an aperture which is secured to the strap release.

Then, the ripcord cable passes through the end of the main container closing loop so as to block the plurality of flaps in a closed position.

The end of the ripcord cable then locks the drogue bridle fastening device.

Preferably, the ripcord cable is a coated cable or a double coated cable.

The device thereby incorporates automatic opening means of the main container enabling, with the outgoing drogue bridle, to pull the ripcord cable which is located between the end of the ripcord protector housing and the closing loop in order to open the main container, in case the traction performed by the user on the main parachute ripcord only causes the release of the drogue bridle.

One of the alternate embodiments provides two cables for the closure of the main container and the release of the drogue bridle, these two cables being independent from each other but connected by the same end to the main handle, such that one of the cable free ends closes the main container and the other locks the suspension strap fastening device.

In this way, acting on the ripcord withdraws the cable ends simultaneously and causes both the opening of the main container and the release of the drogue bridle.

Except for these two main arrangements, a third arrangement consists, in the systems of the present type, in connecting a repeater to the main handle in the shape of a triggering cord whose end is a loop which connects the cable(s) of the drogue parachute fastening device and the main handle by an aperture which is arranged within the metallic protector housing.

The other end of the cord is connected to a handling tip which is located preferably in the side opposite to the main handle.

This repeater can be considered as a secondary handle in case the user did not operate on the main handle.

In this way, the preferred embodiment includes, for example, a right hand opening triggering cable and a left hand opening triggering cord.

Other features and advantages of the present invention will be best understood from the following description of the invention embodiments.

According to alternate and non-restrictive embodiments of the invention, the equipment is such that:

- the number of fastening straps which are directly or indirectly connected to the parachute pack is at least equal to two, and their configuration is complementary in order to enable the mutual or successive fastening of the drogue bridle fastening means to each part of the parachute pack having a fastening strap;
- the fastening means are autonomous or complementary to each other;
- the fasteners consist of strap(s) which is/are connected to the harness strap device and is/are able to be partly fastened to the main container or connected to a locking adapter fastened to the harness strap device;
- the locking of the drogue bridle fastening device is provided by at least one cable which is connected to the main handle;
- the closure of the main container is preferably provided upstream by the same cable or by another cable which is connected to the same main handle;
- when there is only one cable to close the main container and the drogue bridle fastening device, an aperture is fastened to the strap release, such that the main parachute ripcord cable passes through between the ripcord protector housing termination and the closing loop;
- the connection of the fastening straps which connect the parachute pack to the drogue bridle is releasable by acting on the main handle or on the secondary handle;
- the opening of the main container is controlled either by the manual withdrawal of a ripcord, or by the outgoing drogue bridle.

The present invention therefore provides a parachute pack, particularly for tandem jumps, including a pack on the back of which a parachute harness is fastened, which is characterized in that, when the main container flaps are closed by the closing system, at least two fastening tabs protrude from two opposite sides of the main container on the pack side where the flaps open; each fastening tab extends in the main container into a fastening strap and carries on its part protruding out of the main container fastening means cooperating with complementary fastening means which are carried by the drogue bridle end which is opposite to the one which carries the drogue parachute, the fastening means and the complementary fastening means constituting together the releasable connection of the parachute pack and of the drogue bridle, the fastening means being arranged so as to release the fastening tabs from the drogue bridle when operating manually on a locking cable, each fastening strap being further fastened to the harness.

This arrangement of the fastening tabs enables, when the drogue parachute is deployed, a horizontal or substantially horizontal position of the parachutist with his/her load.

According to a first particular feature, the drogue bridle carries a third ring, a second ring and a locking loop forming with the first rings which are carried by each fastening tab, a "three-ring" system with two big rings, which can be operated by the locking cable, in which the three-ring system smallest ring is the third ring, the intermediate ring is the second ring and the big rings are the first rings, which are caught simultaneously in the "three-ring" system.

Quick releasing systems, such as multi-ring systems, could also be contemplated.

According to a first alternate embodiment, a first ring which is carried by one of the fastening tabs can have a torus diameter and a diameter which are respectively superior to the torus diameter and the diameter of the first ring which is carried by the other of the fastening tabs, in order to fit, at least partly, into each other in their contact area in the three-ring system which is formed by the rings of the fastening tabs and of the drogue bridle.

According to a second alternate embodiment, the first rings which are carried by the fastening tabs can be bevelled in a complementary way at their parts in contact in the "three-ring" system which is formed by the rings of the fastening tabs and of the drogue bridle.

According to another particular feature of the invention, the drogue bridle carries on its end which is opposite to the one which carries the drogue parachute, a first ring, constituting with a second ring which is carried by a fastening tab, a third ring, a fourth ring and a locking loop which are carried by the other fastening tab of a four-ring system, the four-ring system which is formed being able to be operated by a locking cable having an end closing the four-ring system, the fastening tab carrying the second ring being connected to the drogue bridle, such that the second ring is caught simultaneously between the third ring which is carried by the other fastening tab and the first ring which is carried by the drogue bridle, in order to form a concentric-type four-ring system, in which the four-ring system smallest ring is the fourth ring, and the big ring is the first ring.

According to another particular feature of the invention, the drogue bridle carries on its end which is opposite to the one which carries the drogue parachute, a first ring constituting with a third ring, a second ring and a locking cord which are carried by each fastening tab of two "three-ring" systems, both "three-ring" systems which are formed being able to be operated by a locking cable having two ends each closing one of the "three-ring" systems, each fastening tab being connected to the drogue bridle, such that the rings which are carried by each fastening tab and the ring which is carried by the drogue bridle, form a "three-ring" system, in which each "three-ring" system smallest ring is the third ring, the intermediate ring is the second ring and the big ring is the first ring.

According to another particular feature of the invention, the locking cable constitutes the closing system of the main container flaps and extends so as to cooperate with the loop of the "three-ring" system which is carried by the drogue bridle or by each fastening tab to lock it.

According to another particular feature of the invention, another ripcord cable constitutes the closing system of the main container flaps and can be controlled by the user simultaneously with the locking cable.

According to another particular feature of the invention, an aperture is formed on the strap release, the control cable closing the main container flaps being mounted in use in order to be passed into this aperture before closing the main container flaps.

According to another particular feature of the invention, the strap release carries a closing pin of the main container flaps, the pin constituting the closing system of the main container flaps such that when the "three-ring" system is disconnected, the drogue bridle which is released exerts a traction on the strap release, which will open the main container in order to release the main deployment bag.

According to another particular feature of the invention, each fastening strap is directly sewed on the harness, or passes into at least one loop which is sewed on the harness, the loop optionally including an adjustment means becoming a locking adapter of the length of the fastening tab protruding from the main container.

The fastening tabs can be releasable from their respective fastening strap.

According to another particular feature of the invention, the parachute pack includes a fastening strap, which consist of two straps which are connected at an end, arranged, at least partly, within the main container, such that the fastening strap extends on either side of two opposite sides of the main deployment bag, each end of the fastening strap protruding from the main container constituting a fastening tab, the fastening strap being further passed into a loop which is sewed on the harness, the loop optionally including an adjustment means of the length of the fastening tabs protruding from the main container.

The parachute pack can further include an optionally resilient ripcord which is connected at one end to a secondary opening control handle, and at the other end, to the ripcord cable or the control cables, thereby triggering the departure of the drogue parachute by an action of the user on the secondary handle.

BRIEF DESCRIPTION OF THE SEVERAL VIEWS OF THE DRAWING

The invention will now be described in detail with reference to exemplary and non-limitative accompanying drawings of the invention. They only represent some of the embodiments of the invention and will allow their readily comprehension.

FIG. 7: detailed view of the lower fastening tab which is shown in FIG. 6;

FIG. 8: detailed view of the upper fastening tab which is shown in FIG. 6;

FIG. 12: top view of the preferred embodiment of the closure of the container and of the device fastening according to the invention;

FIG. 13: detailed side view of the drogue bridle fastener which is shown in FIGS. 6 and 12;

FIG. 14: detailed view of the partial action on the ripcord in the preferred embodiment;

FIG. 15: view of an alternate embodiment for the closure of the main container and the locking of the drogue bridle fastener;

FIG. 16: detailed top side lateral view of the main container, for an alternate embodiment of the fastening mode of the drogue bridle;

FIG. 17: detailed bottom side lateral view of the main container, for an alternate embodiment of the fastening mode of FIG. 16;

FIG. 18: detailed view of the fastening tab which is shown in FIGS. 16 and 17;

DETAILED DESCRIPTION OF THE INVENTION

Figure 1:
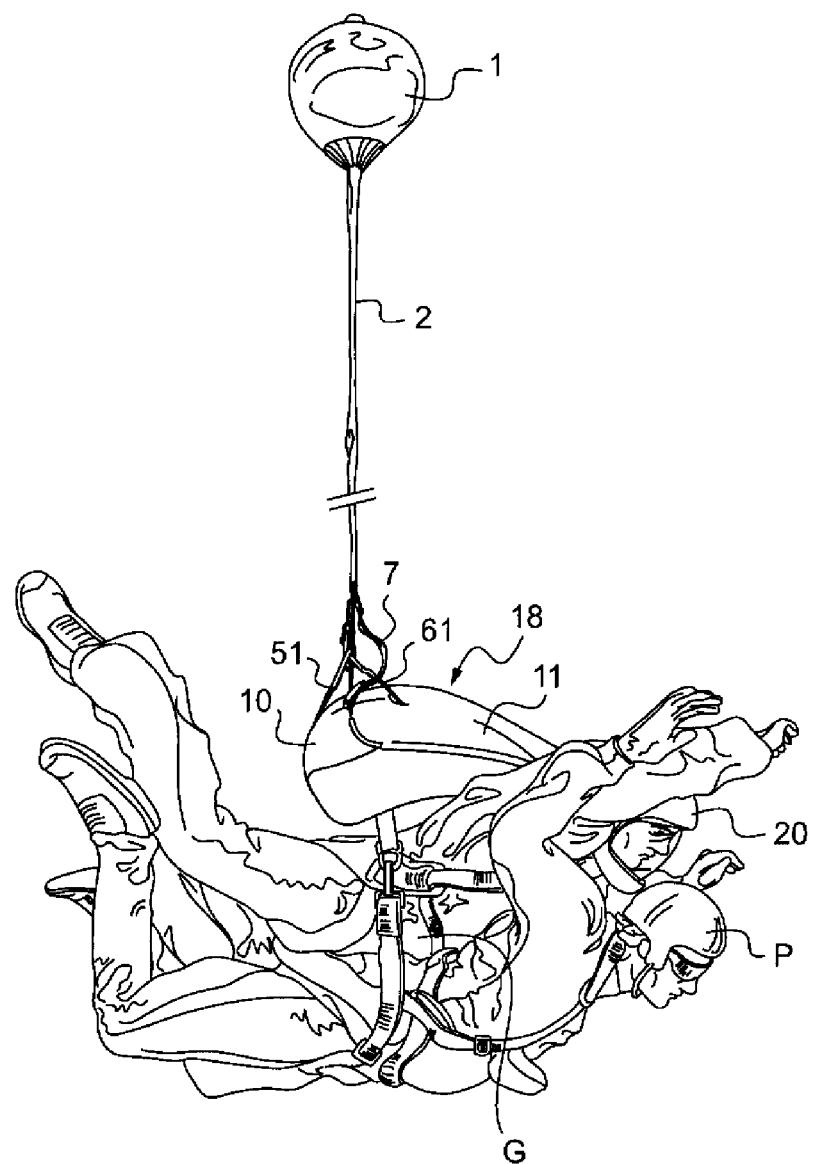
FIG. 1: side view of the device of the present invention in free fall during a tandem skydive.

The present invention is described more in detail hereinafter in reference to the accompanying drawings, on which the invention preferred embodiments are represented.

However, the present invention can be implemented in different ways and does not have to be restricted to the embodiments which are described herein.

Actually, these embodiments are provided as an example, for this description to be thorough and comprehensive and completely explains the scope of the invention to the ordinary skilled in the art.

Identical reference numerals shall designate identical elements throughout the description.

In the different embodiments of the devices according to the invention, the main container closure is represented according to the use of one or the other of the drogue parachute collapsing means currently existing on the tandem parachutes.

The drogue bridle is, in this view, passed through in a way which is known in itself, by one or several kill line(s) which slide(s) inside said drogue bridle.

Thereafter in the description and the drawings, it will be considered that there is one kill line, without this feature being limitative.

In order not to overload the drawings, the kill line does not appear systematically in all the drawings.

In all embodiments of the invention in which the cable for closing the main container is used so as to lock the drogue bridle fastening means, an aperture is provided and is located on the strap release.

As explained in the summary of the invention, the strap release is the link between the drogue bridle and the main deployment bag, the strap release being represented either connected to the kill line end which is closest to the main deployment bag, or constitutes the continuity of the kill line, separated from the latter by a stop, or the strap release is the continuing extension of the drogue bridle which is located between the drogue parachute releasing system and the main deployment bag.

In reference to FIG. 1, an embodiment of the present invention was represented in a side view and during free fall, namely a parachute system which consists of a parachute pack (18) which includes the drogue parachute (1) of the drogue bridle (2) which is connected substantially above the main container (10) center so as to provide, in a tandem jump, a skydive position of the pilot (20) and of his/her passenger (P), in a horizontal position.

Thus, during the free fall stage which is represented in FIG. 1, it is to be noticed that, thanks to the invention, the traction which is exerted by the drogue parachute (1) applies equally through the drogue bridle (2), on both hooking points which are constituted by the rings at the end of fastening tabs (51, 61), which are connected to the parachute pack (18) by fastening straps, the suspension effort generated by the drogue parachute (1) being transmitted to the parachute pack (18) at a location between the top and the bottom of the main container (10).

This centralized fastener holding ensures the positioning of the tandem couple in a balanced way, in a horizontal position during the fall.

In such a device, in which the horizontal centering is ensured, the traction of the drogue parachute (1) substantially exerts at a location which is generally located above and in the alignment with the tandem couple center of gravity G. Indeed, the drogue parachute (1) drogue bridle (2) applies, by means of both fastening tabs (61) and (51), a traction which is located above the main container (10) middle, that is to say substantially in the axis of the tandem couple center of gravity G.

The pilot (20)-passenger (P) pair is not in suspension on the main container closing flaps as described in the prior art devices.

Figure 2:
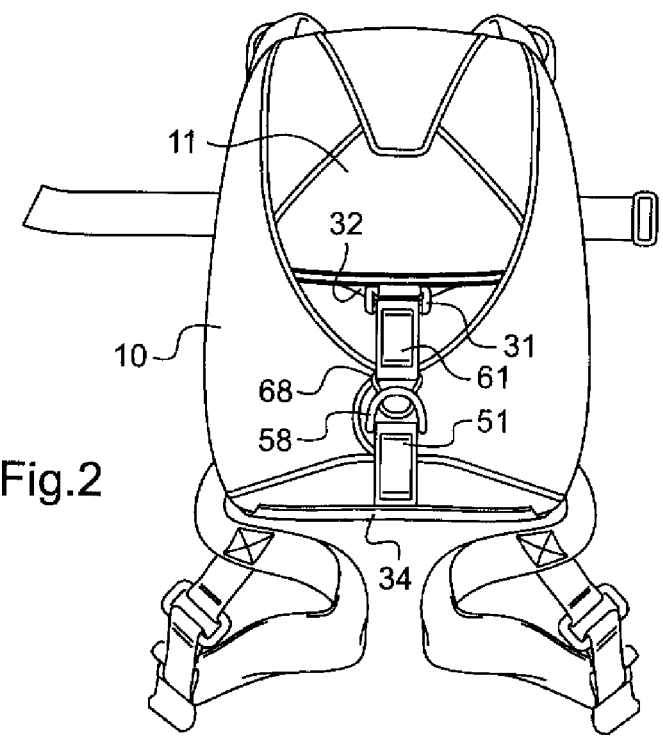
FIG. 2: front view of the preferred embodiment.
Figure 3:
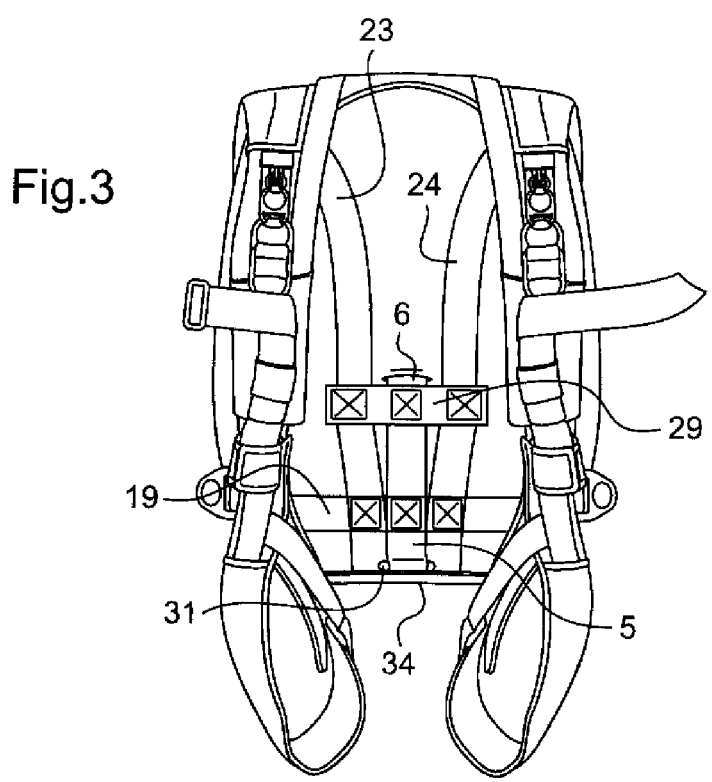
FIG. 3: back view of the preferred embodiment.

Thus, the device according to the invention differs from the closest prior art which is represented in the French patent FR 2915735, in which the drogue parachute is connected to a stop which is captured by the closure of the main container flaps. FIG. 2 represents the preferred embodiment of the device when viewed from the front and FIG. 3 represents the holding mode of the same device when viewed from the back.

In the exemplary embodiment described in FIG. 2, the parachute pack assembly (18) is shown in a simplified mode, without the assembly of the drogue parachute (1) drogue bridle (2), or the main container (10) closing mode, in order not to overload FIG. 2.

The main container (10) is filled by the volume of the main canopy which is folded in the main deployment bag (4) and the main container closing flaps are in a closed position; this arrangement ensures the physical separation between both fastening tabs (51) and (61), as long as the opening of the main container is not triggered.

In the example which is illustrated in FIG. 2, the upper fastening strap (6) terminates, at its end which is not sewed to the strap device, into a connection unit such as a metal connector (31), said connector (31) serving as a removable connection to the upper fastening tab (61).

For its connection and its holding to the parachute pack (18), the device has an upper fastening strap (6) and a lower fastening strap (5) which can consist of two separated straps or a unique strap known as double strap, as represented in FIG. 3, in which is shown a holding mode of the fastening device to the parachute pack (18) when viewed from the back of the parachute pack.

This double upper (6) and lower (5) fastening strap is sewed to the harness strap device which is located in the backpad, on the one hand, at the horizontal back strap (19) level as far as the lower fastening strap (5) is concerned, and on the other hand, at a strap element (29) level which is provided so as to ensure the holding of the upper fastening strap (6) between both vertical back straps (23, 24). The double fastening strap is thus arranged in order to surround the main container (10), such that the traction of the drogue parachute (1) is transmitted to the harness strap device by the fastening straps (5, 6).

Both fastening tabs (51, 61) each have at their free end a terminal ring (58, 68) which serves as a connection to the drogue bridle (2).

When the lower (51) and upper (61) fastening tabs are not removable by a quick release fastener, such as the metal connector (31), both fastening straps (5, 6) can be a single strap which would be, for example, fastened to the strap device in a similar way as the one which was explained previously and extended such that the total length is such that the rings (58, 68), which are located at each free end, can come and superimpose so as to connect to the main container (10) center, as shown in FIG. 2.

In the preferred embodiment of the invention, the lower fastening strap (5) does not pass through the main container fabrics wall, it bypasses it, being ended at its end which is not sewed to the strap device by another removable metal connector (31) which can be seen in FIG. 3, which serves as a removable connection to the lower fastening tab (51).

The lower fastening tab (51) passes between the main container fabrics wall and the drogue parachute (1) pocket (34) which is located at the bottom of the main container (10), the pocket (34) being arranged in a way which is known in itself, under the main container (10) so as to facilitate the manual extraction of the drogue parachute (1) by the pilot (20).

Another drogue parachute (1) storage can consist in providing the latter in a pocket which is located between the main container (10) and the reserve container (11).

The surrounding of the main container (10) from the top consists therefore in the upper fastening strap (6) and the upper fastening tab (61) thereof, and the surrounding of the main container (10) from the bottom consists in the lower fastening strap (5) and the lower fastening tab (51) thereof.

Figure 4:
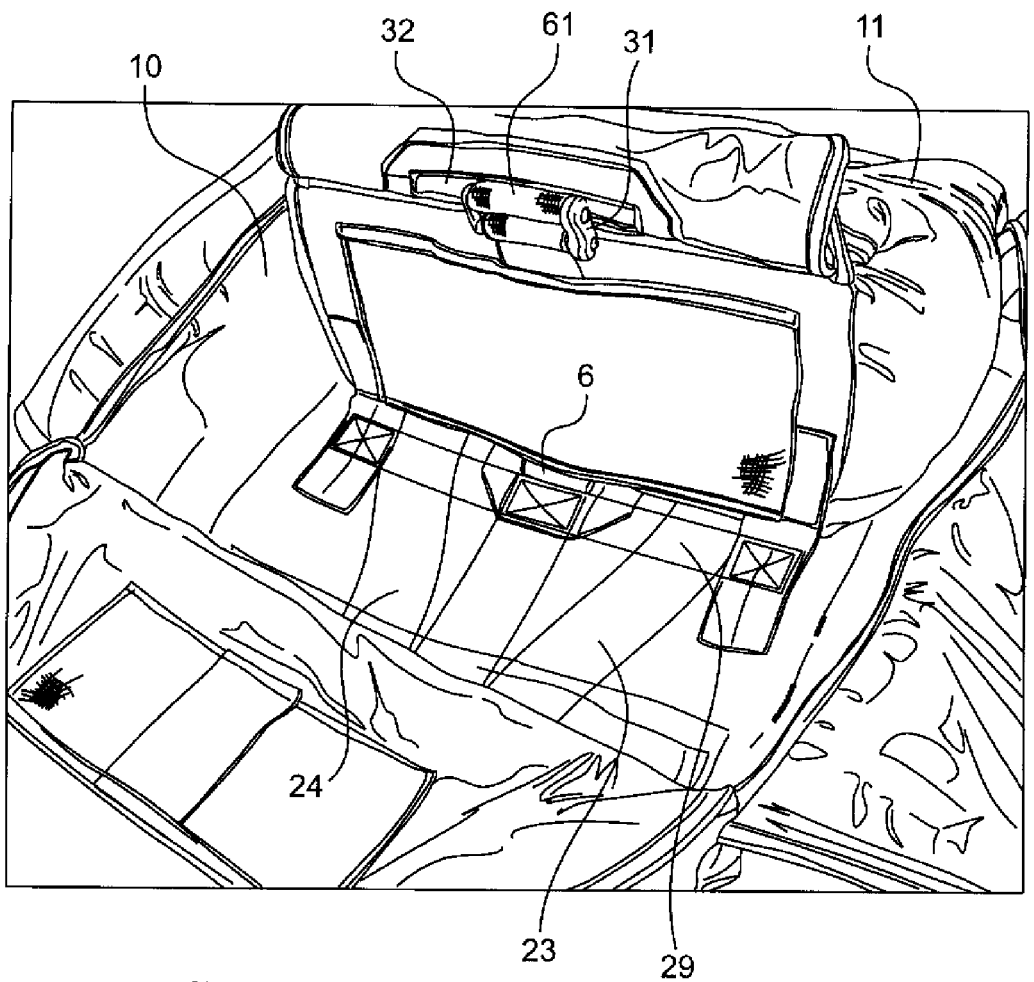
FIG. 4: cutaway view of the main container of the preferred embodiment.

In FIG. 4, it is shown a cutaway view, from the inside of the main container (10), of the fastening of both fastening straps (5, 6) against the parachute pack (18) backpad, the holding of the upper fastening strap (6) being achieved by the strap element (29) which is sewed transversally to the vertical back straps (23, 24), whereas the holding of the lower fastening strap (5) is achieved by sewing it on the horizontal back strap (19).

The portion of the upper fastening strap (6) which is not sewed to the strap device passes transversally into the main container (10) wall which is located against the reserve container (11) wall, through the window (32) before ending connected to the fastening tab (61) by the removable metal connector (31).

Figure 5:
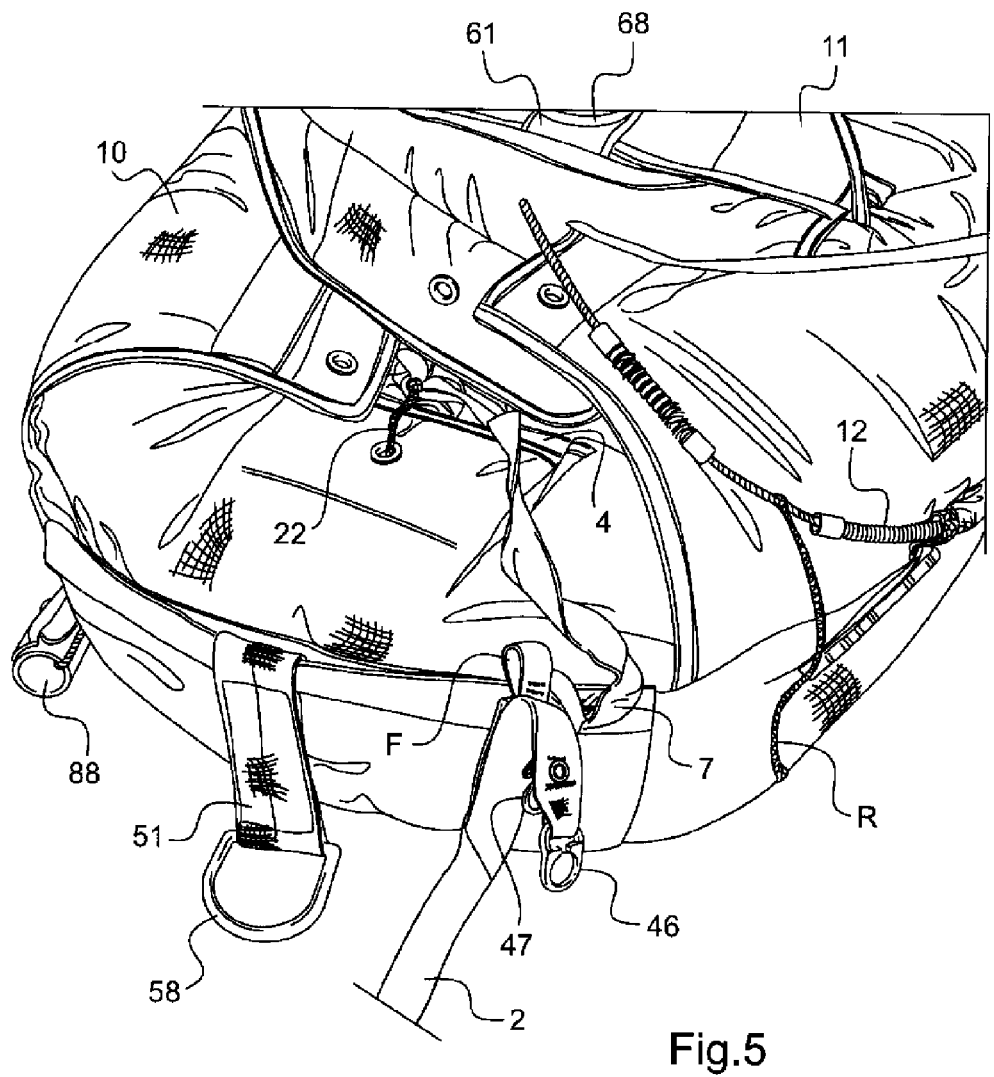
FIG. 5: top view, from the bottom of the closure of the main container in the preferred embodiment.

Thus, the packing process so as to achieve the opening of the main parachute comprises, as represented in FIG. 5, a step which consists in providing a main canopy inside a deployment bag (4) with which the main canopy works when it is deployed; providing the main deployment bag (4) inside the main container (10) having a plurality of closing flaps folding so as to enclose the main deployment bag (4) inside the main container (10), when the closing flaps are in a closed position; passing the aperture (F) which is integral with the strap release (7) into the free end of the ripcord cable (42) which stands out from its protector housing (12), before passing through the end of the closing loop (22) which brings all closing flaps together in order to block the plurality of closing flaps in the closed position to fasten the main deployment bag (4) and so, the main parachute inside the main deployment bag (4), such that one part of the strap release (7) is inside the main container (10) by passing through the folded and closed flaps, the other part of the strap release (7) extending towards the outside of the main container (10), while the closing flaps are in a closed position, as represented in FIG. 1.

In this embodiment, the arrangement of the aperture (F) is useful in order to open the main container (10) and deploy the main parachute if the user only exerts a partial traction on the main ripcord cable, as explained later.

Figure 10:
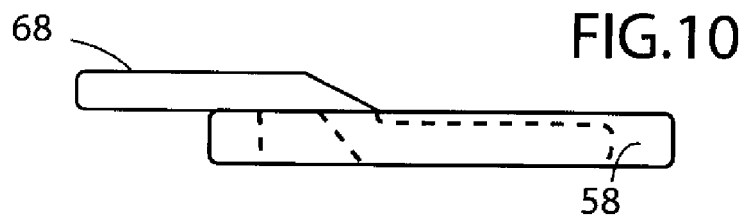
FIG. 10: side view of FIG. 9.
Figure 9:
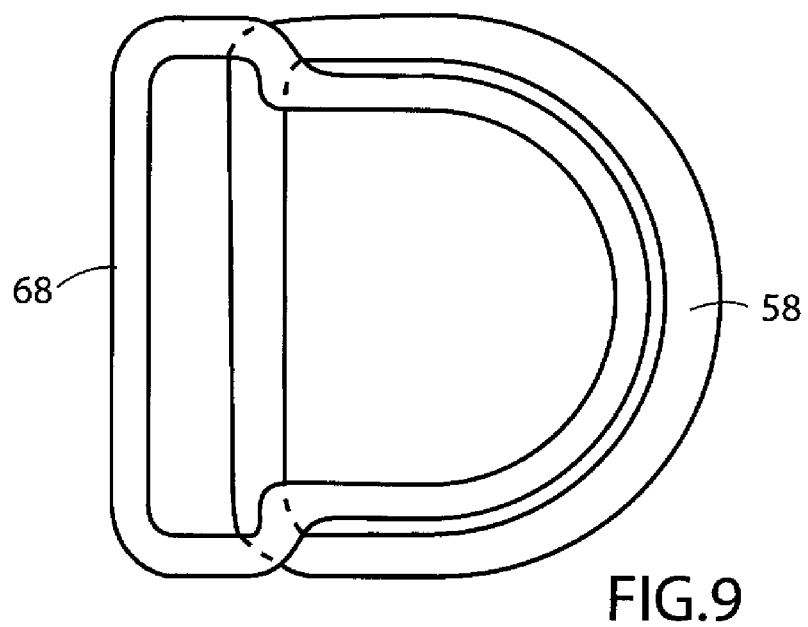
FIG. 9: top view of the assembly of the upper and lower big rings of the preferred embodiment.
Figure 21:
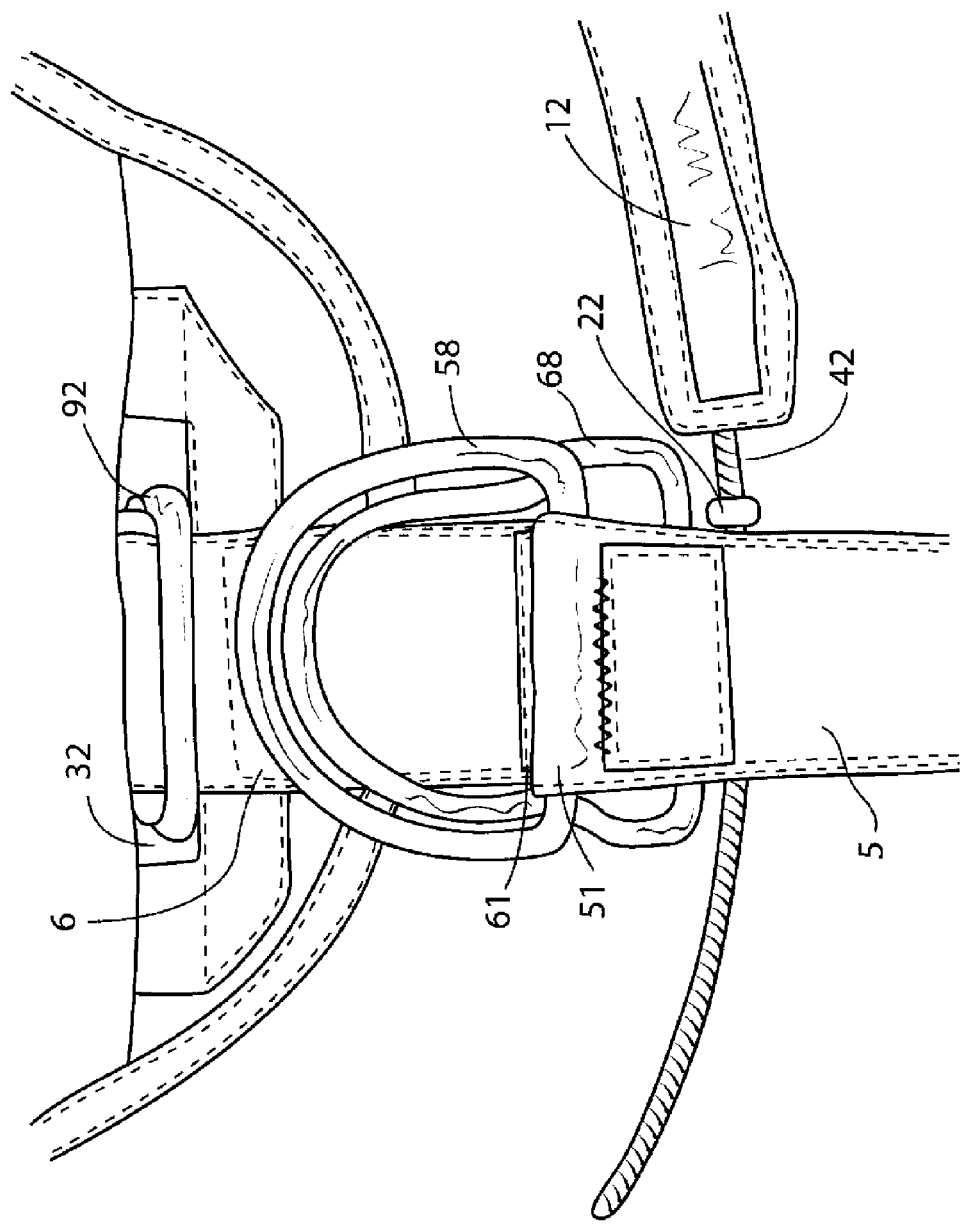
FIG. 21: top view of the main container with the central arrangement of the big ring assembly.

In FIGS. 9, 10 and 21 is illustrated the storage when folding the big rings (58, 68) by a top and a side view, before their assembly with the drogue bridle (2) and the straining of the latter by the extraction of the drogue parachute (1).

When superimposing the big rings (58, 68), the upper big ring (68) semi-circle has an outer diameter which is smaller than the lower big ring (58) inner diameter, such that it fits into the lower big ring (58) semi-circle, the horizontal diametric bar which is at the base of the latter serving as a stop, and coming and being accommodated in the upper big ring (68) recess for a better assembly, as represented in FIG. 10.

In this way, once the drogue bridle (2) hooking means are arranged, the upper big ring (68) cannot pass through the lower big ring (58).

Figure 6:
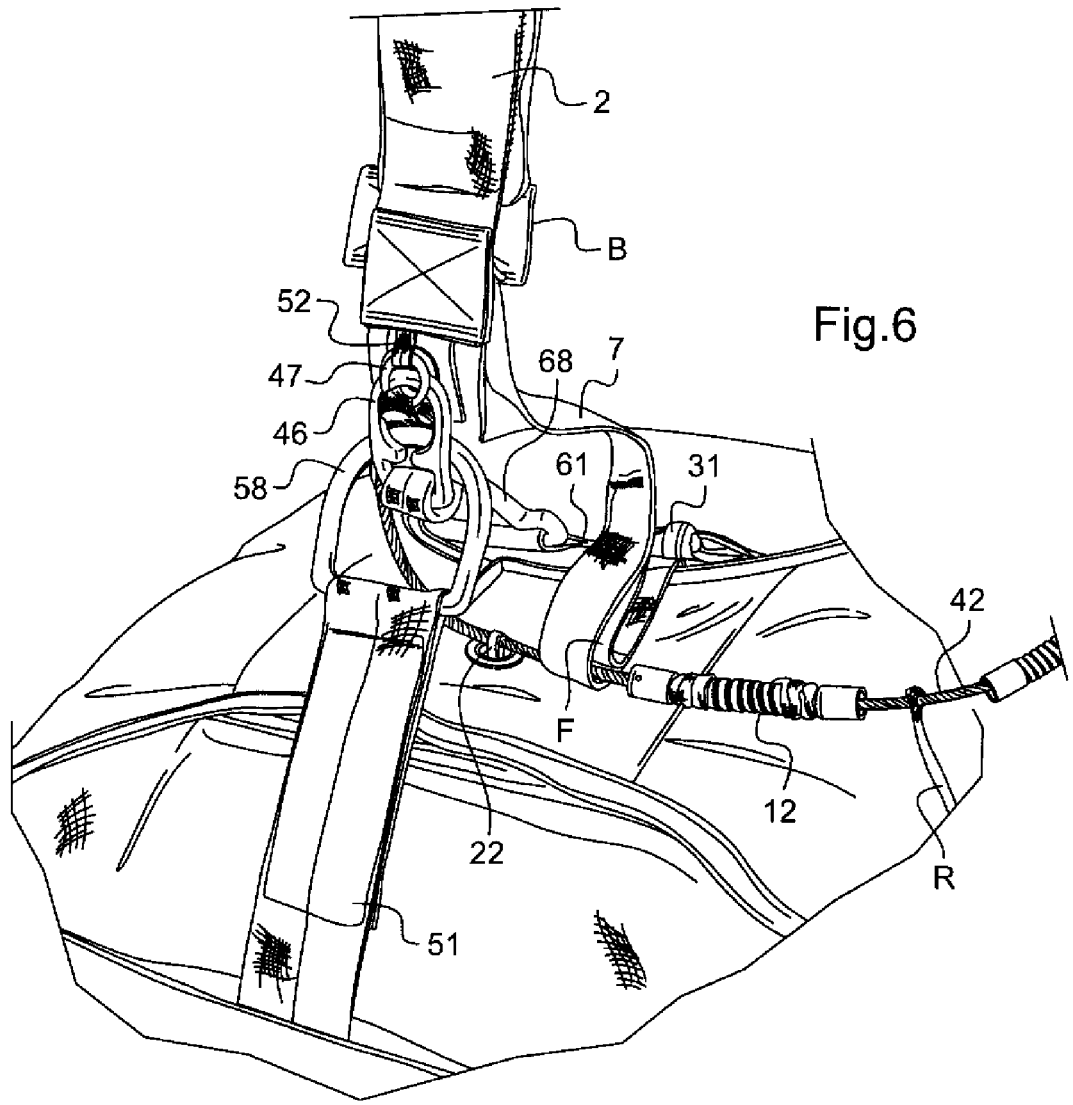
FIG. 6: top view, from the bottom, of the preferred embodiment of the closure of the main container and of the drogue bridle fastening.

In FIG. 6, the preferred embodiment of the main container (10) closure and the fastening of the tensioned drogue bridle (2) are illustrated. In this example, the embodiment consists of an alternative embodiment in the three-ring-type releasing system, such as described in the aforecited Booth patent.

The fastening device consists in connecting the drogue bridle (2) to the fastening means that the fastening tabs (51) and (61) constitute, thanks to the assembly of the big rings (58, 68), in order to being able to be released mutually and simultaneously.

Figure 11:
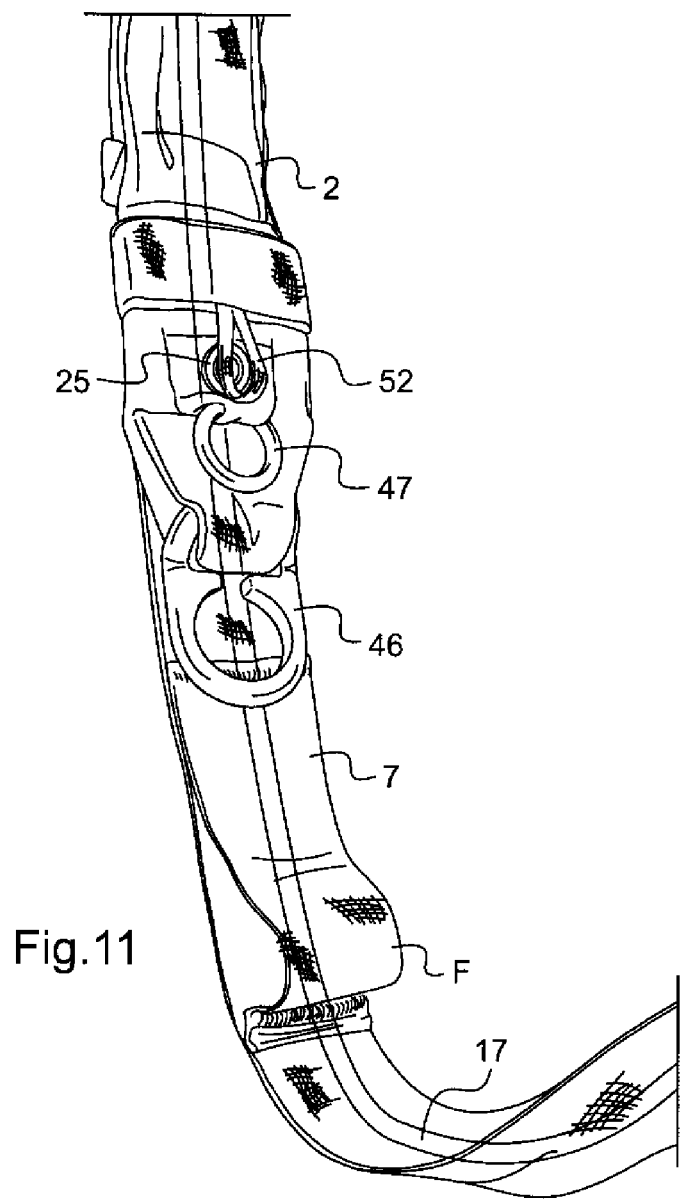
FIG. 11: view of the drogue bridle hooking points in the preferred embodiment.

For that purpose, the drogue bridle (2) end which is located opposite the drogue parachute (1), has two hooking points comprising an intermediate ring (46) and a small ring (47), which are represented in detail in FIG. 11.

The drogue bridle (2) is releasably connected both to the lower big ring (58) which is fastened to the lower fastening tab (51), and to the upper big ring (68) which is fastened to the upper fastening tab (61).

So as to assemble the drogue parachute (1) drogue bridle (2) with the parachute pack (18), said lower big ring (58) receives said upper big ring (68) as represented in FIG. 9, the set of the semi-circles of the big rings (58, 68) which are therefore fitted into each other, being connected by the passage of the intermediate ring (46) webbing, such that the lower big ring (58) remains superimposed to the upper big ring (68) during the assembly.

As represented in detail in FIG. 11, the intermediate ring (46) consists of only one opening, and has a two-consecutive-plane oval shape enabling it to better ensure the connection of both big rings (58, 68) together and to hold them in a superimposed position, the intermediate ring (46) having lugs restricting the motion of said intermediate ring (46) buckle-end.

The intermediate ring (46) is operational to pass through the big rings (58) and (68) so as to ensure the connection between the parachute pack (18) strap device and the drogue bridle (2) and during the release of the drogue bridle (2), can pivot and withdraw at the same time from both big rings (58) and (68) so as to enable a simultaneous release of the big rings (58, 68), and therefore of the parachute pack (18) with the drogue bridle (2).

A circle-shaped small ring (47) which is identical to the one used as a small ring on main canopy risers, is fastened by a webbing to the drogue bridle (2) so as to be able to pivot, the small ring (47) being operational with the intermediate ring (46) and releasably passing through the intermediate ring (46) to secure said intermediate ring (46) thanks to a locking loop (52) and the ripcord cable (42).

Thus, a locking loop (52) passes through the small ring (47) and goes through a grommet which is crimped on the drogue bridle (2) to ensure, by the passage of the ripcord cable (42) into the locking loop (52) end, the holding of the rings (46) and (47) in a position pressed against said drogue bridle (2).

In the embodiment which is represented in FIG. 12, the closure of the main container (10) with a second feature of the invention is shown. In this Figure, the blocking of the plurality of the main container (10) closing flaps is applied by the ripcord cable (42) which is also used downstream as a locking means of the drogue bridle (2) fastening device.

Thus, given this other feature of this device, the main container (10) ripcord cable consists of a unique ripcord cable (42) which, once it leaves its protector housing (12), passes through an aperture (F) before being used as a closing pin through the closing loop (22) to hold the plurality of the main container (10) closing flaps in a closed position, then serving as a locking means to the drogue bridle (2) fastening device.

In accordance with this preferred embodiment, the release of the drogue bridle (2) and the opening of the main container (10) are not achieved at the same time, but successively, in the order which is described later in a detailed manner, by only one operation on the same ripcord.

It can be useful to notice, at this stage of the description, that the action of completely pulling the main handle first releases the drogue bridle (2) from its traction on the big rings (58, 68) which are connected to the parachute pack (18) thanks, firstly, to the withdrawal of the ripcord cable (42) out of the locking loop (52), then causes the simultaneous opening of the main container (10) closing flaps thanks, secondly, to the withdrawal of the ripcord cable (42) from the main container (10) closing loop (22), in order to trigger the opening of the main parachute.

In FIG. 7 is represented in detail the lower fastening tab (51) with, at one end, a loop (62) enabling the passage of a removable metal connector (31) for its connection to the lower fastening strap (5), and at the other end, a lower big ring (58) comprising a semi-circle whose inner diameter is superior to the upper big ring (68) outer diameter and the torus diameter of this lower big ring (58) is also superior to that of the upper big ring (68) which is represented in FIG. 8.

In FIG. 8 is represented in detail the upper fastening tab (61). It has at one end a loop (62) enabling the passage of a removable metal connector (31) for its connection to the fastening strap (6), and at the other end, a ring member which consists of an upper big ring (68) comprising a semi-circle whose outer diameter enables it to fit into the lower big ring (58), and the torus diameter which is smaller than that of the lower big ring (58) favours its alignment under the lower big ring (58) when the drogue bridle (2) is tensioned under the traction effect of the drogue parachute (1).

In FIG. 13 is represented in a side and detailed view, the preferred arrangement of the main container (10) closing means and the locking means of the drogue bridle (2) fastening means.

Furthermore, so as to cause the opening of the main container (10) in case the manual action on the main container (10) ripcord restricted to the sole release of the drogue bridle (2), a preferred arrangement includes a connecting means of the drogue bridle (2) to the main container (10) ripcord cable (42), such as the aperture (F) which is fastened on the strap release (7) which is integral, in this FIG. 13, with the drogue bridle (2).

The aperture (F) is arranged between the main container (10) closing loop (22) and the end of the cable (42) protector housing (12) as explained previously, such that, in the event of an incomplete action on the main container (10) ripcord, when the ripcord cable (42) is withdrawn from the only fastening device of the drogue bridle (2), the departure of the latter is ensured of causing the opening of the main container (10) by straining the ripcord cable (42), in order to ensure the opening of the main container (10) in case the amplitude of the action on the main container (10) ripcord is not sufficient.

This goal is achieved provided that the aperture (F) is arranged in such a way that it will be passed through by the ripcord cable (42) before the closure of the main container (10) during the packing operation, as explained previously.

In FIG. 14 is represented a partial manual action on the ripcord cable (42) withdrew from the drogue bridle (2) fastening device, without the ripcord cable (42) having withdrawn from the main container (10) closing loop (22).

The fact of only partly pulling the ripcord cable (42) which is illustrated in reference to FIG. 14, shows, as an example, that the withdrawal of the ripcord cable (42) of the locking loop (52) end resulted in initiating a series of releasing of the "three-ring" system of the drogue bridle (2) fastening device to the parachute pack (18), which works in this order: the small ring (47) is released and pivots out of the intermediate ring (46); consequently, the intermediate ring (46) can pivot at the same time out of the big rings (58, 68) to which it was linked, thus simultaneously releasing the drogue bridle (2) and both fastening tabs (51, 61) which are secured to the fastening straps (5, 6) which are fastened to the parachute pack (18) strap device.

Thus, both fastening tabs (51) and (61) have the function to be releasable simultaneously so as to ensure the separation of the drogue bridle (2) from the parachute pack (18) when acting on the ripcord.

As illustrated on FIG. 14, the partial manual action on the ripcord causes the departure and separation of the drogue bridle (2); following the departure of the drogue bridle (2), the big rings (58) and (68) separate mutually and the upper (61) and lower (51) fastening tabs loosen naturally, following the suppression of the tension of the drogue bridle (2), as illustrated in FIG. 14.

The departure of said drogue bridle (2) controls a tensioning of the strap release (7), in such a way that the traction is transmitted to the ripcord cable (42) by the aperture (F) which is secured to said strap release (7), which implements the automatic disconnection device with such a strength that it can withdraw the ripcord cable (42) end out of the closing loop (22) before totally tensioning the strap release (7), consequently enabling the opening of the main container (10) and the extraction of the deployment bag (4), and therefore the deployment of the main canopy.

In FIG. 15 is represented an alternate embodiment of the closure of the main container (10) and of the drogue bridle (2) fastening device (2), which uses two closing pins (33, 38), each non represented end of which is connected to the main handle.

The cable (38) visible end is used to maintain in a blocked position the main container (10) plurality of closing flaps, and the cable (33) other free end is used to lock the drogue bridle (2) fastening means to the parachute pack (18).

It will be noticed that the cable (38) length in excess which is located above the closing loop (22) is equal to or smaller than the cable (33) length in excess which is located above the locking loop (52), such that when acting on the ripcord, the opening of the main container (10) occurs simultaneously or before the release of the drogue bridle (2), but not after.

For the sake of clarity of FIG. 15, a section of the strap release (7) was concealed, but its routing remains identical to that of the preferred embodiment. It will be noticed that the strap release (7) does not have an aperture (F), whose presence is useless in this embodiment, which ensures that the controlled opening of the main container occurs in conjunction with the disconnection of the drogue bridle (2) fastening device.

In FIG. 16 is represented an alternate embodiment in which the assembly of the drogue bridle (2) to the parachute pack (18), with the upper fastening tab (61) and the lower fastening tab (51), is performed particularly by means of the bevelled ring (69) which is located at an end of each fastening tab (51, 61), as represented in detail in FIG. 18.

For that purpose, the drogue bridle (2) end which is located near the parachute pack, has two hooking points which consist of an intermediate ring (56) and a small ring (47) which are identical to those which are known in the prior art, which are provided in the risers for main canopy.

The bevelled and complementary shape of each ring (69) enables them to reduce the torus thickness, and consequently, the length of the strap which is devoted to the buckle-end which holds the intermediate ring (56).

The device consists in connecting the drogue bridle (2) to the end parts of the fastening means that the fastening tabs (51) and (61) constitute, thanks to the big rings (69), so as to be able to be released mutually and simultaneously, in the same way as the one which was described previously.

As represented in FIG. 16, both rings (69) are assembled side by side and they are held thanks to the passage of the intermediate ring (56) strap which temporarily captures both rings (69) together.

The small ring (47), which is also secured to the drogue bridle (2), then passes through the intermediate ring (56); the small ring (47) is operational with the intermediate ring (56) so as to be able to pivot, then is secured as known in the prior art and represented in FIG. 17, by a nylon locking loop (52) which passes through a grommet (25) which is integral with the drogue bridle (2), before being passed through by the ripcord cable (42) which also serves as the main container (10) ripcord cable and thus, to connect the parachute pack (18) to the drogue bridle (2), while being releasable by the sliding of the ripcord cable (42) when the parachutist acts on the ripcord.

Figure 19:
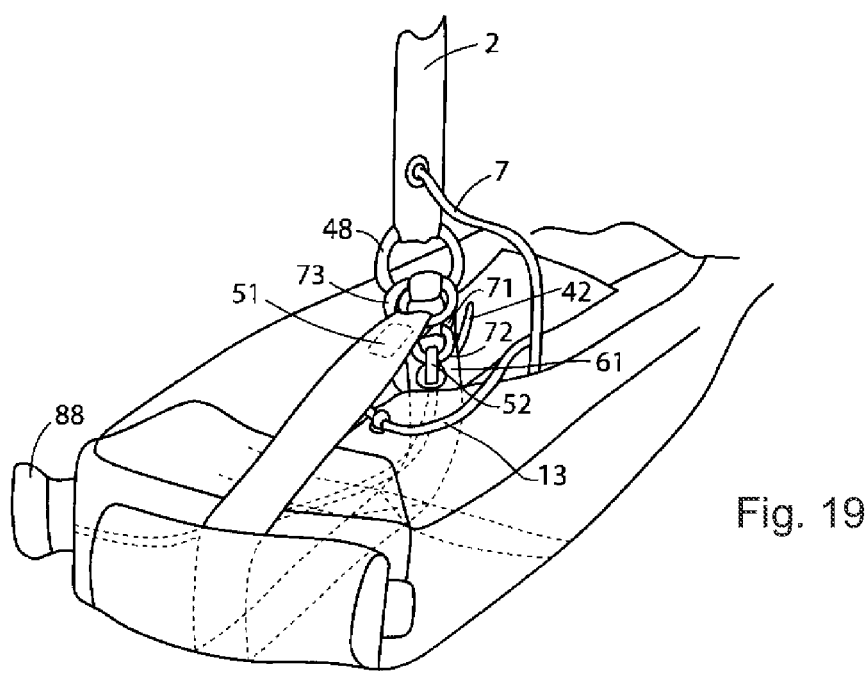
FIG. 19: view, from the main container's bottom, of an alternate embodiment of the closure and the fastening mode of the drogue bridle.

It will be noticed that the arrangement of the main container (10) closure by a closing pin (13), such as the one represented in FIG. 19, which is arranged on the strap release (7) and which is already known from the prior art, can be used in all the embodiments of the invention.

In FIG. 19 is represented an alternate embodiment for the closure of the main container (10) and the fastening of the drogue bridle (2), in which the drogue bridle (2) carries a big ring (48) at the opposite end to the drogue parachute (1) and the upper fastening tab (61) has a third ring (71), a fourth ring (72) and a locking loop (52), while the lower fastening tab (51) has only one ring, the second ring (73) of a multi-ring fastening device.

All the ring sizes are concentric, such that the second ring (73) has an outer diameter which is smaller than the big ring (48) inner diameter, the third ring (71) has an outer diameter which is smaller than the second ring (73) inner diameter and the fourth ring (72) has an outer diameter which is smaller than the third ring (71) inner diameter.

This arrangement enables the second ring (73) to fit into the big ring (48) during the storage, and the assembly order is carried out such that the third ring (71) is passed into the big ring (48); then, the second ring (73) is arranged in the third ring (71); then, the third ring (71) is pulled down so as to be passed through by the fourth ring (72), before being locked by the locking loop (52) which passes through the grommet to be captured by the ripcord cable (42) which is connected to the opening control handle (88).

In this way, the second ring (73) is caught between the big ring (48), which is fastened to the drogue bridle (2) end, and the webbing, which carries the third ring (71); thus, during the traction of the drogue bridle (2), the big ring (48) strains the upper fastening tab (61) and the lower fastening tab (51) equally, and when acting on the opening control handle (88), the release of the four-ring device releases the upper fastening tab (61) and the lower fastening tab (51) simultaneously, thanks to the pivoting and the mutual separation of the rings (73, 71) out of the ring (48).

Figure 20:
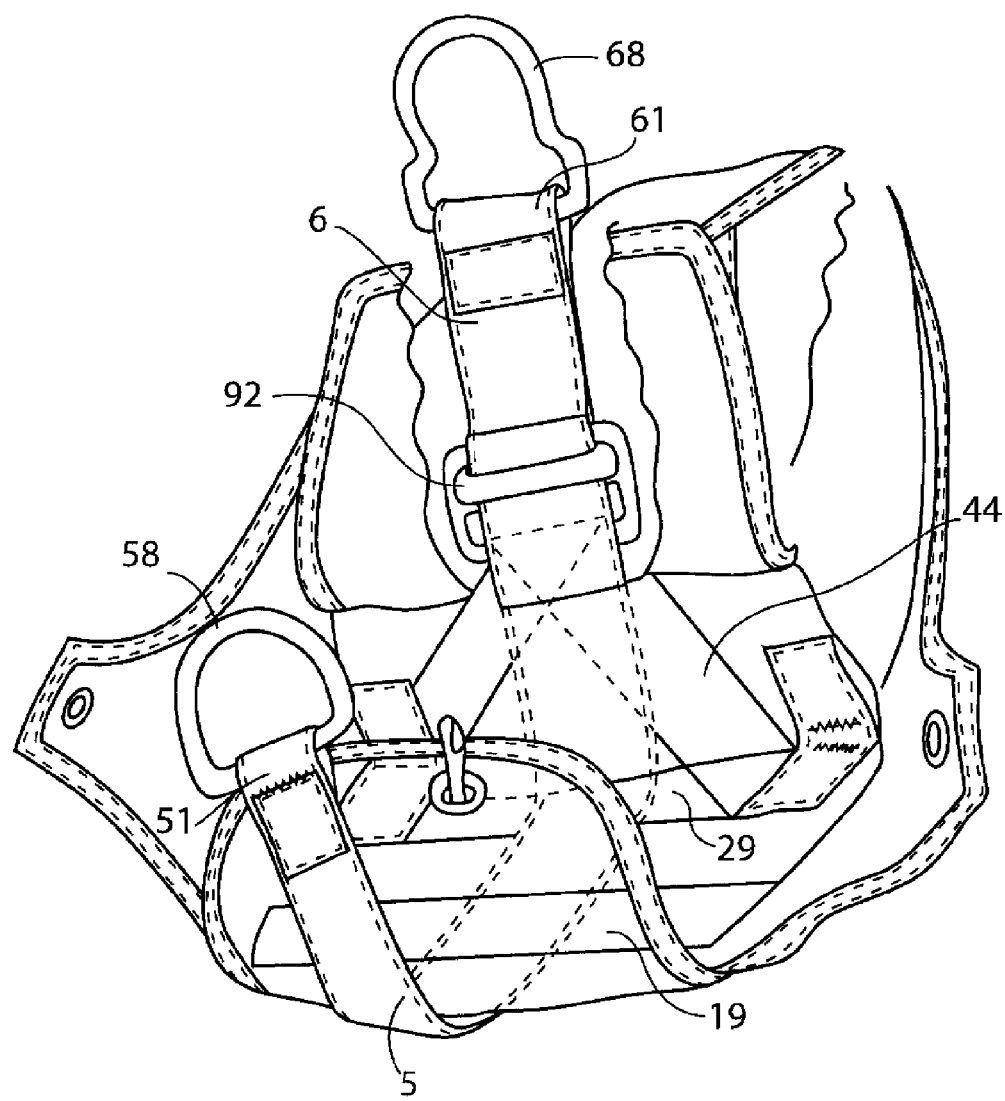
FIG. 20: cutaway view of the main container for an alternate embodiment for the fastening mode.

In FIG. 20 is represented the arrangement of a sole fastening strap and its routing which surrounds the main container (10) and is carried out such that said strap is not directly fastened to the harness strap device.

The holding of said strap integral with the parachute pack (18) is ensured by its passage into an adjustment mechanism such as a locking adapter (92), which is connected to the harness strap device by a link such as the support strap (44) which is fastened in the main container (10) back, for example, at a strap element (29) or horizontal back strap (19) level.

According to this alternate embodiment, the locking adapter (92) includes adjustment means which consists of an axially mobile bar, which is adapted for enabling the routing and the locking of the upper (6) and lower (5) fastening straps.

In accordance with the invention, the upper fastening strap (6) passes through a window (32) and its extension as a lower fastening strap (5) bypasses the main container by passing between the horizontal back strap (19) and the fabrics of the back container, before passing under the bottom of container pocket (34) which is absent from FIG. 20, such that the lower fastening strap (5) leans on the horizontal back strap (19) when it is strained by the traction of the drogue bridle (2) when the drogue parachute (1) is tensioned.

In FIG. 21, in accordance with the invention, is represented the initial central assembly arrangement of the big rings (58, 68), substantially at the main container (10) center, when the equipment is dedicated to skydiving with a pilot and a passenger.

Figure 22:
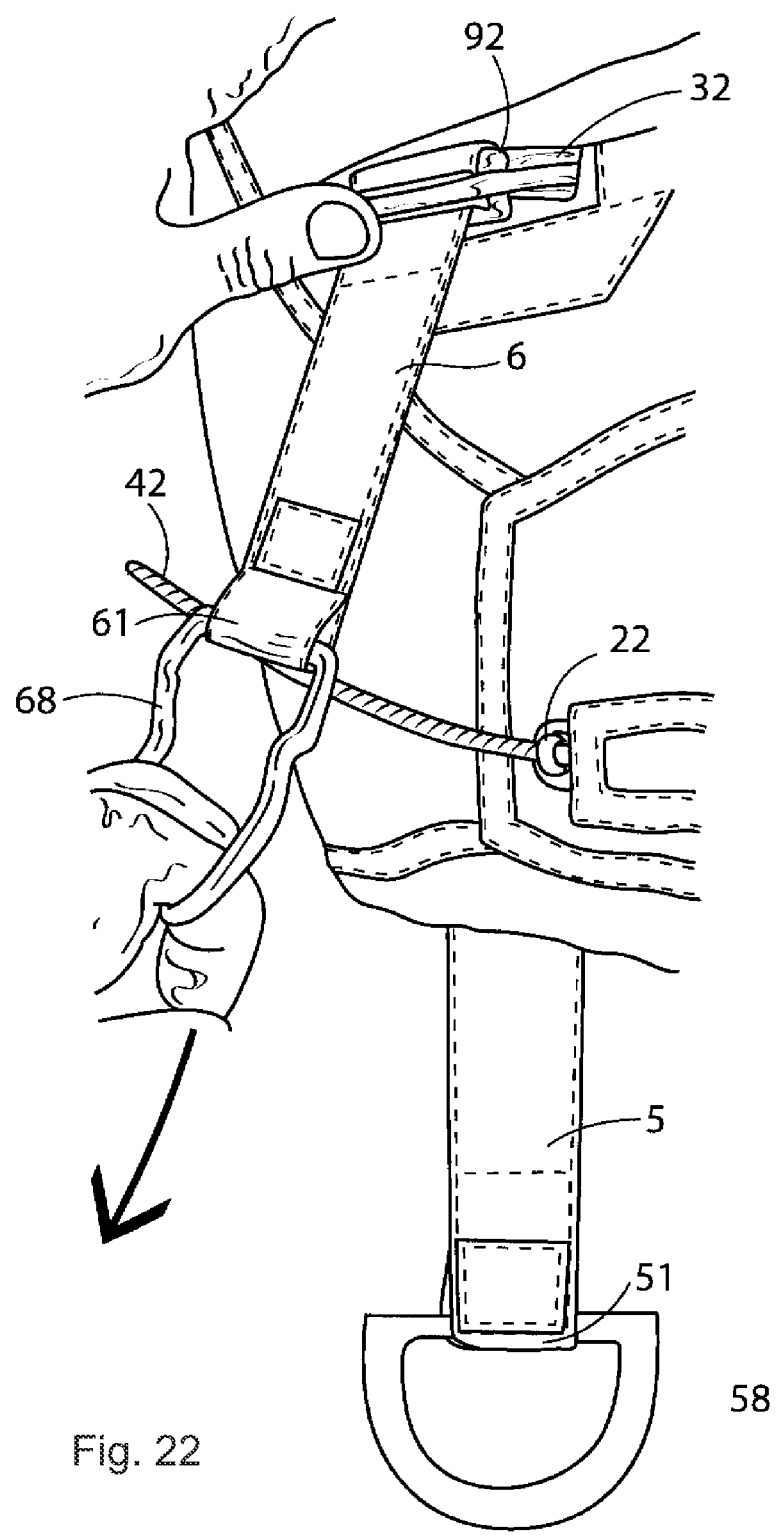
FIG. 22: view of the adjustment of the upper fastening strap from the central arrangement.

In FIG. 22 is represented how to carry out, by a manual action, the adjustment of the upper fastening strap (6) relative to the lower fastening strap (5), in such a way that the length of the upper fastening strap (6) section increases while that of the lower fastening strap (5) section decreases simultaneously; in this way, the reciprocal length of the fastening straps varies whereas the contact surface of the big rings (58, 68), is identical, such that they always join together in a same superimposition, whatever the performed adjustment height.

Figure 23:
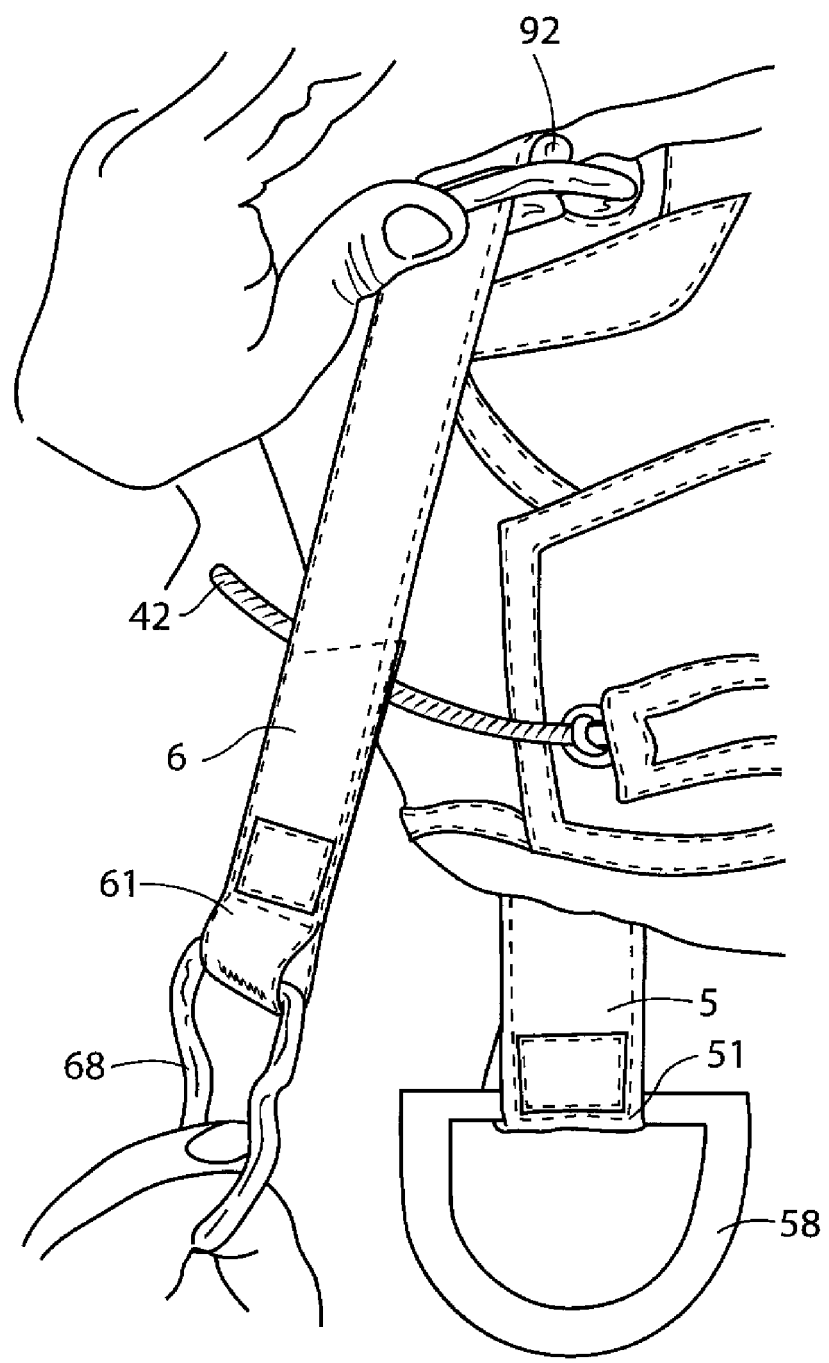
FIG. 23: end of the adjustment of the upper fastening strap in a low center arrangement.

In FIG. 23, a traction is exerted on the upper fastening strap (6) section, which results, as compared to the state in FIG. 22, in shortening the lower fastening tab (51) after sliding in the locking adapter (92).

The routing of the fastening straps around an axial mobile pin is arranged so as to lock them in the position when they are under traction.

The position will be maintained in a locked state in position by the friction of the locking adapter (92) during the storage and by the arrangement of the upper (6) and lower (5) fastening straps which are advantageously connected to each other so as to form a closed loop when a traction is exerted simultaneously on both fastening straps (5), (6), as it is the case when both fastening tabs (51, 61) are connected to the drogue bridle (2), and the drogue parachute (1) is under traction.

Only a traction which is exerted separately on one of both fastening straps enables the adjustment of the length of one fastening strap relative to the length of the other fastening strap.

Figure 24:
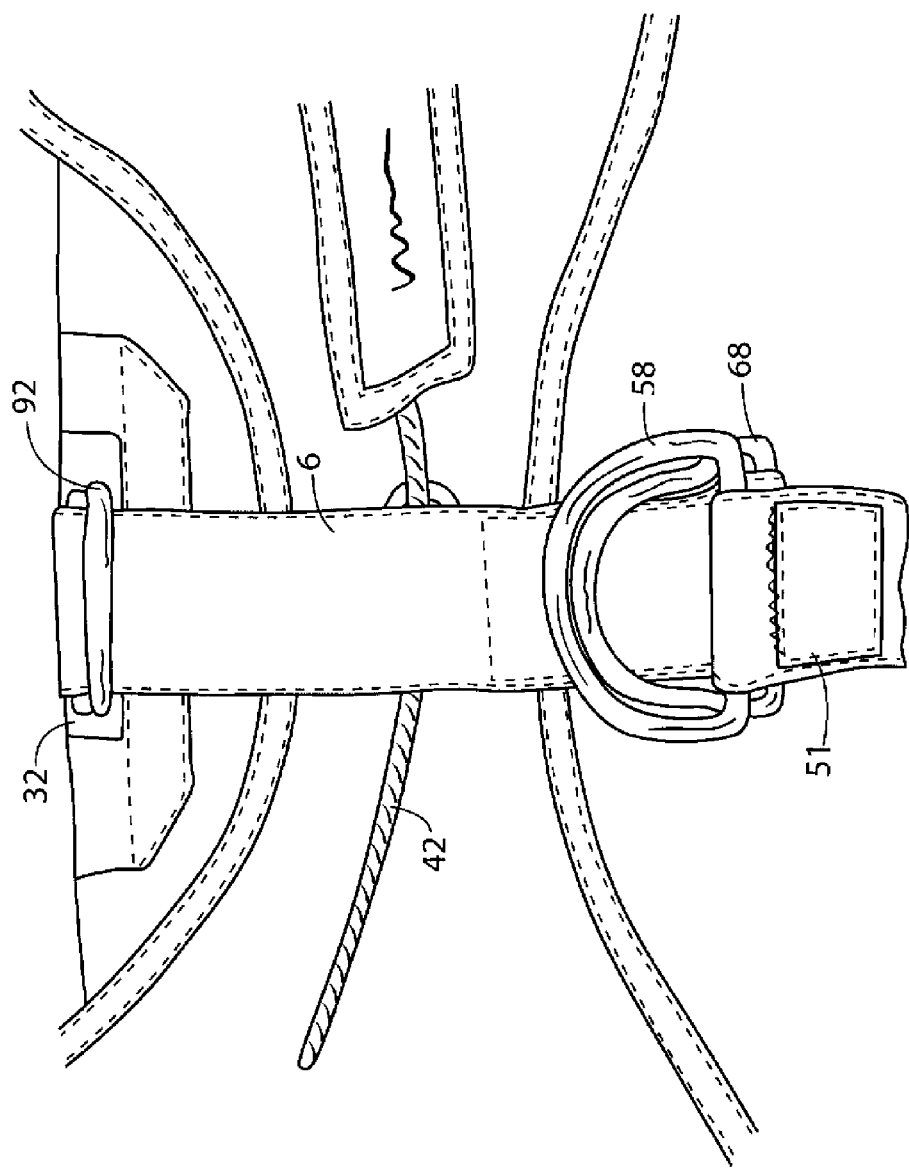
FIG. 24: top view of the main container with the big ring assembly being arranged in a low center arrangement.

In FIG. 24 is represented the final arrangement of the assembly of the big rings (58, 68) above the main container, which was achieved after the adjustment of the length of the fastening straps (5, 6) which was explained previously; it is noticed that, further to the adjustment which was carried out previously, the assembly position of both big rings (58, 68) moved towards the bottom of the main container (10).

This assembly position of the big rings (58, 68) with the drogue bridle (2) with a low centering position, is perfectly suitable for replacing a pilot, whose load would be located at the back of the pilot's center of gravity, in a horizontal position.

Of course, such an embodiment also allows to achieve, by an opposite operation to that which was described previously, the adjustment of the fastening tabs with a high centering position, by shortening the section which is devoted to the upper fastening tab (61), which amounts to increasing the length of the section which is dedicated to the lower fastening tab (51).

In FIG. 6, a third arrangement of the embodiment of the present invention which is described herein, is adapted so that the main handle preferably includes a ripcord cable (42) extending between the main handle until beyond the locking cord (52) of the fastening device of the drogue parachute (1) drogue bridle (2).

Thus, by a simple extension of a forearm, the parachutist can easily implement the opening process of the main parachute. The manual traction on the main handle causes the ripcord cable (42) to withdraw from the locking loop (52), then from the closing loop (22) which holds the main container (10) flaps in a closed position, to fasten the deployment bag (4) inside the main container (10).

In case this forearm is inoperative for any reason, it is provided a repeater R of the ripcord of the main container or the secondary handle which is located near the other forearm.

The secondary handle includes a repeater R whose end loop captures the ripcord cable (42) main handle through an aperture in the metal protector housing (12) of the ripcord cable (42) main handle.

In this way, any traction on the secondary handle leads to the withdrawal of the ripcord cable (42) main handle out of the locking loop (52), causing the release of the drogue parachute (1) drogue bridle (2).

Thanks to this arrangement, the secondary handle provides a pulley-type cooperation with the ripcord cable (42) main handle, which offers a mechanical advantage to the parachutist when the secondary handle is pulled manually.

This arrangement was preferred because it increases the parachutist security and the practical aspect; indeed, the triggering cord of the repeater R which constitutes the secondary handle line has the other end which is connected to a handling device like a handle which is located near the hand which is opposite to the main handle.

The big rings (58, 68) can consist of metal pieces which are removable by means of an axis which includes a screw, in the same way as the one represented for the ring (69) in FIGS. 16 and 17.

The intermediate ring (46) can also have a circular shape and a sole plane. So as to better ensure the reduction when releasing the fastening device, the latter can consist of a series of rings instead of the traditional three-ring system, without changing the invention in any way.

Another embodiment consists in using other mechanisms of connection and separation of the drogue bridle (2) from the parachute pack (18), without changing the invention in any way.

The lower fastening strap (5) or/and the upper fastening strap (6) can each consist of a two-"V"-shaped-branch fastening as a fastening means to the parachute pack (18) with the fastening of big rings at the "V" letter tips.

Storage pockets can be provided on the back container housing so as to retract the fastening tabs and their rings when the parachute is used in the version without a drogue parachute (1) and when the fastening tabs become useless.

The fastening straps can also be arranged on both sides, to the right and to the left of the main container (10), instead of above and beneath the main container (10), in order to ensure the holding of the deployment bag (4) and the centralized fastener above the main container (10).

In an alternate embodiment which is not represented, the locking adapter (92) can be arranged instead of each metal connector (31) and the fastening straps (5, 6) progress around their mobile axis independently from each other, such that the user can carry out the adjustment of the drogue parachute (1) suspension point at different heights of the main container (10).

The locking adapter (92) can consist of a two-piece loop or a spring loop in order to compress the fastening strap as known in the prior art for leg straps.

The metal connector (31) can be substituted by any kind of removable connector, including a textile connection means.

The handle can consist of a simple double-pin cable, one for ensuring the closing of the main container (10), the other for locking the drogue bridle (2) fastening device.

The invention claimed is:

1. A parachute pack, particularly for tandem jumps, including a pack at the back of which a parachute harness is fastened, the pack including:
  a main container and a reserve container, the main container having a bottom and side walls each extending into a flap, the flaps which are formed for the main container closing the main container by means of a closing system, the main container bottom corresponding to the lower part of the back of the pack and the main container opening by means of the flaps on the outside face on the side of the pack facing away from the wearer, and the main container being for containing in use a main deployment bag, the opening of the main container flaps triggering the release of the main deployment bag;
  a drogue parachute connected to the main deployment bag by a set comprising a drogue bridle, a kill line and a strap release, the drogue bridle releasably connecting the drogue parachute to the parachute pack, the strap release connecting the drogue bridle or the kill line to the main deployment bag, and the kill line collapsing the drogue parachute after the function of the drogue parachute is completed or after the main parachute is opened,
  wherein, when the main container flaps are closed by the closing system, at least two fastening tabs protrude from two opposite sides of the main container, on the pack side where the flaps open, each fastening tab extending in a fastening strap fastened to the parachute harness and carrying on the protruding part protruding from the main container a large ring, the drogue bridle end which is opposite to the end which carries the drogue parachute carrying a small ring, a middle ring and a locking loop, the middle ring passing through both large rings, the small ring passing through the middle ring, the locking loop passing through the small ring and being secured by a locking and ripcord cable passing through the locking loop to form a ring release system operable by the locking and ripcord cable, the ring release system constituting the releasable connection of the parachute pack and the drogue bridle, the ring release system being arranged so as to release the drogue bridle from the fastening tabs when manually operating on the locking and ripcord cable.

2. A parachute pack according to claim 1, wherein a large ring carried by one of the fastening tabs has a torus diameter and a diameter which are respectively bigger than the torus diameter and the diameter of the large ring which is carried by the other of the fastening tabs in order to fit, at least partially, into each other in their contact area in the ring release system which is formed by the fastening tabs rings and the drogue bridle.

3. A parachute pack according to claim 1, wherein the large rings which are carried by the fastening tabs are bevelled in a complementary way at their parts in contact in the ring release system which is formed by the fastening tabs rings and the drogue bridle.

4. A parachute pack according to claim 1, wherein the locking and ripcord cable constitutes the closing system of the main container flaps and extends to cooperate with the locking loop of the ring release system which is carried by the drogue bridle or by each tab in order to lock the main container.

5. A parachute pack according to claim 1, wherein another control cable constitutes the closing system of the main container flaps and is controllable by the user simultaneously with the locking cable.

6. A parachute pack according to claim 1, wherein an aperture is formed on the strap release, the control and ripcord cable closing the main container flaps being mounted in use in order to be passed into this aperture before closing the main container flaps.

7. A parachute pack according to claim 1, wherein the strap release carries a closing pin of the main container flaps, the closing pin constituting the closing system of the main container flaps such that, when the ring release system is disconnected, the released drogue bridle exerts a traction on the strap release, which opens the main container so as to release the main deployment bag.

8. A parachute pack according to claim 1, wherein each fastening strap is directly sewed on the harness, or passes into at least one locking adapter which is sewed on the harness, the locking adapter optionally including adjustment means of the length of the fastening tab protruding from the main container.

9. A parachute pack according to claim 1, wherein the fastening tabs are releasable from their respective fastening straps.

10. A parachute pack according to claim 1, wherein the parachute pack includes a fastening strap made of two straps which are connected to one end, which is arranged at least partly in the main container, such that the fastening strap extends on either side of two opposite sides of the main deployment bag, each end of the fastening strap protruding from the main container, constituting one of the fastening tabs, the fastening strap being further passed into a locking adapter including adjustment means of the length of the fastening tabs protruding from the main container.

11. A parachute pack according to claim 1, wherein the parachute pack further includes a ripcord which is connected at one end to a secondary opening control handle, and at the other end, to the ripcord or to control and ripcord cables, thus triggering the drogue parachute by an action of the user on the secondary control.

12. A parachute pack according to claim 11, wherein the ripcord is resilient.

* * * * *